(12) United States Patent
Yan et al.

(10) Patent No.: US 12,035,188 B2
(45) Date of Patent: Jul. 9, 2024

(54) INFORMATION TRANSMISSION METHOD AND APPARATUS

(71) Applicant: Huawei Technologies Co., Ltd., Shenzhen (CN)

(72) Inventors: Le Yan, Shenzhen (CN); Tingting Geng, Shanghai (CN); Hongping Zhang, Shenzhen (CN); Qinghai Zeng, Shanghai (CN); Xiaoli Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 17/401,129

(22) Filed: Aug. 12, 2021

(65) Prior Publication Data

US 2021/0377831 A1    Dec. 2, 2021

Related U.S. Application Data

(63) Continuation of application No. PCT/CN2020/072645, filed on Jan. 17, 2020.

(30) Foreign Application Priority Data

Feb. 14, 2019   (CN) .......................... 201910115219.9

(51) Int. Cl.
*H04W 36/36*   (2009.01)
*H04W 36/00*   (2009.01)

(52) U.S. Cl.
CPC . *H04W 36/00837* (2018.08); *H04W 36/0072* (2013.01); *H04W 36/0077* (2013.01); *H04W 36/0079* (2018.08); *H04W 36/362* (2023.05)

(58) Field of Classification Search
CPC ......... H04W 36/0072; H04W 36/0077; H04W 36/0079; H04W 36/00837;

(Continued)

(56) References Cited

U.S. PATENT DOCUMENTS 10,028,257 B2    7/2018   Jung et al.
2011/0306345 A1   12/2011   Wu
(Continued)

FOREIGN PATENT DOCUMENTS

CN    104202779 A    12/2014
CN    107113673 A    8/2017
(Continued)

OTHER PUBLICATIONS

ASTRI, TCL Communication Ltd., "Discussion on Conditional Handover in NR", 3GPP TSG-RAN WG2 Meeting #101, Feb. 26-Mar. 2, 2018, R2-1802008, (Resubmission of R2-1800663), 6 pages, Athens, Greece.

(Continued)

*Primary Examiner* — Jean A Gelin
(74) *Attorney, Agent, or Firm* — Slater Matsil, LLP

(57) ABSTRACT

Embodiments of this application provide an information transmission method, an apparatus, and a system. A first network device sends, to a terminal device, conditional handover configuration information that includes information about candidate cells and a handover trigger condition; after receiving the conditional handover configuration information and performing a conditional handover, the terminal device sends, to a second network device, a first failure cause value corresponding to a candidate target cell and/or a second failure cause value corresponding to a to-be-determined cell during the conditional handover; and the second network device receives the first failure cause value and/or the second failure cause value from the terminal device, and sends the first failure cause value and/or the second failure cause value to the first network device.

21 Claims, 7 Drawing Sheets

(58) Field of Classification Search
CPC . H04W 36/0083; H04W 36/08; H04W 36/36; H04W 36/305; H04W 36/362
See application file for complete search history.

(56) References Cited

U.S. PATENT DOCUMENTS

| | | | |
|---|---|---|---|
| 2020/0045602 A1 | 2/2020 | Jiang | |
| 2021/0058834 A1* | 2/2021 | Paladugu | H04W 36/0058 |
| 2021/0168678 A1* | 6/2021 | Deenoo | H04W 76/19 |
| 2021/0176682 A1* | 6/2021 | Guo | H04W 36/34 |
| 2021/0314833 A1* | 10/2021 | Hao | H04W 36/00837 |
| 2022/0030483 A1* | 1/2022 | Cheng | H04W 36/0058 |
| 2022/0030485 A1* | 1/2022 | Kim | H04W 36/36 |
| 2022/0038963 A1* | 2/2022 | Zhang | H04W 36/0011 |
| 2022/0264394 A1* | 8/2022 | Wang | H04W 36/00837 |
| 2022/0303841 A1* | 9/2022 | Yang | H04W 36/0079 |
| 2022/0330107 A1* | 10/2022 | Chang | H04W 36/36 |
| 2022/0394583 A1* | 12/2022 | Deenoo | H04W 74/0841 |
| 2022/0408323 A1* | 12/2022 | Ishii | H04W 36/0055 |
| 2023/0007542 A1* | 1/2023 | Teyeb | H04W 36/0016 |
| 2023/0007553 A1* | 1/2023 | Rugeland | H04W 36/0058 |
| 2023/0354065 A1* | 11/2023 | Zhang | H04W 76/20 |

FOREIGN PATENT DOCUMENTS

| | | |
|---|---|---|
| EP | 3358901 A1 | 8/2018 |
| EP | 3611963 A1 | 2/2020 |
| KR | 20150110407 A | 10/2015 |
| KR | 20160147785 A | 12/2016 |
| KR | 20180122963 A | 11/2018 |
| WO | 2018170777 A1 | 9/2018 |
| WO | 2018172600 A1 | 9/2018 |

OTHER PUBLICATIONS

Huawei, HiSilicon, "Discussion on RACH and RLF report", 3GPP TSG-RAN WG2 Meeting #103bis, Oct. 8-12, 2018, R2-1813904, 4 pages, Chengdu, China.

"Signaling Procedure for Conditional Handover," Source: vivo, Agenda Item: 12.3.3, Document for: Discussion and Decision, 3GPP TSG-RAN WG2 Meeting #103bis, R2-1814194, Chengdu, China, Oct. 8-12, 2018, 4 pages.

3GPP TS 36.300 V15.4.0 (Dec. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 363 pages.

3GPP TS 38.300 V15.4.0 (Dec. 2018), 3rd Generation Partnership Project; Technical Specification Group Radio Access Network; NR; NR and NG-RAN Overall Description; Stage 2 (Release 15), 97 pages.

"Conditional Handover in NR," Agenda Item: 10.2.3.2, Source: Lenovo, Motorola Mobility, Document for: Discussion and Decision, 3GPP TSG-RAN WG2 Meeting #98bis, R2-1702794, XP051253664, Apr. 3-7, 2017, 3 pages.

Ericsson, "Conditional Handover," 3GPP TSG-RAN WG2 NRAH#1801, R2-1801329, Jan. 22-26, 2018, 6 pages, Vancouver, Canada.

InterDigital Inc., "Conditional Hanover for LTE mobility robustness," 3GPP TSG-RAN WG2 Meeting #104, R2-1816786, Nov. 12-16, 2018, 4 pages, Spokane, USA.

* cited by examiner

INFORMATION TRANSMISSION METHOD AND APPARATUS

CROSS-REFERENCE TO RELATED APPLICATIONS

This application is a continuation of International Application No. PCT/CN2020/072645, filed on Jan. 17, 2020, which claims priority to Chinese Patent Application No. 201910115219.9, filed on Feb. 14, 2019. The disclosures of the aforementioned applications are incorporated herein by reference in their entirety.

TECHNICAL FIELD

This application relates to the communications field, and in particular, to an information transmission method and an apparatus.

BACKGROUND

In a mobile communications system, in a conventional handover procedure, mobility management of a connected terminal device is controlled by a network device. To be specific, by sending a handover message, the network device indicates to the terminal device which cell to hand over to and how to hand over. A conventional handover mechanism may include: sending, by a source network device (that is, a network device to which a source cell belongs), the handover message to the terminal device so that the terminal device is controlled to hand over from the source cell to a target cell. The handover message is a radio resource control (RRC) message. Specifically, the RRC message may be an RRC reconfiguration message carrying a reconfiguration-with-sync (reconfiguration with sync) information element or may be an RRC connection reconfiguration message carrying a mobility control info information element. After receiving the handover message, the terminal device accesses the target cell according to content included in the handover message. Therefore, successful sending of the handover message is a necessary condition of ensuring successful handover under a conventional handover mechanism. However, in a long term evolution (LTE) system or a fifth-generation (5G) mobile communications technology (especially in a high-frequency scenario), a failure of sending the handover message may be caused by rapid attenuation of channel quality, rapid movement of the terminal device, blocking by an object, long duration of measurement or handover preparation, or the like, thereby leading to a handover failure and reducing a handover success rate.

In view of the foregoing problems, a conditional handover (CHO) mechanism is put forward in the prior art to improve the handover success rate. Specifically, the source network device sends conditional handover configuration information to the terminal device when a source link is of relatively high quality. The configuration information includes a handover trigger condition configured by the network device for the terminal device and information about one or more candidate cells corresponding to the handover trigger condition. After receiving the conditional handover configuration information, the terminal device determines, based on the configuration information, whether each candidate cell meets the handover trigger condition, and uses a candidate cell meeting the handover trigger condition as a target cell, so as to hand over to the target cell. In the CHO mechanism, the source network device sends the conditional handover configuration information to the terminal device when the source link is of relatively high communications quality, thereby ensuring a success rate of sending the configuration information. Further, based on the configuration information, the terminal device selects the target cell at its own discretion and performs handover, thereby improving the handover success rate.

In both the conventional handover mechanism and the CHO mechanism, a handover-related parameter is always one of key factors that directly affect the handover success rate. In the conventional handover mechanism, a mobility robustness optimization (MRO) mechanism is introduced to optimize a handover parameter. Specifically, the terminal device sends to the network device relevant information generated in a mobility failure procedure, and then the network device optimizes the handover parameter according to the relevant information reported by the terminal device. Under the existing MRO mechanism, the terminal device generally records, in the following two scenarios, the relevant information generated in the mobility failure procedure, and sends the relevant information to the network device: (1) the terminal device fails in receiving the handover message, and a radio link failure (RLF) occurs; and (2) the terminal device successfully receives the handover message but fails in accessing the target cell or an RLF occurs soon after successful access to the target cell.

However, due to a difference between the CHO mechanism and the conventional handover mechanism, the MRO mechanism in the existing conventional handover mechanism is not suitable for optimization of the handover parameter under the CHO mechanism. Therefore, a good mechanism is currently not available for optimizing the handover parameter accurately in time under the conditional handover mechanism.

SUMMARY

In view of the foregoing problems, embodiments of this application provide an information transmission method, an apparatus, and a system to optimize a handover parameter under a conditional handover mechanism.

To achieve the foregoing objective, the embodiments of this application adopt the following technical solutions:

According to a first aspect, an information transmission method and a corresponding communications apparatus are provided. In this solution, a terminal device receives conditional handover configuration information. The conditional handover configuration information includes a handover trigger condition and information about M candidate cells, where M is a positive integer. The terminal device sends a first failure cause value corresponding to at least one candidate target cell and/or a second failure cause value corresponding to at least one to-be-determined cell. The at least one candidate target cell includes X cells that meet the handover trigger condition among the M candidate cells, and the at least one to-be-determined cell includes Y cells that do not meet the handover trigger condition among the M candidate cells. X and Y are natural numbers, and X+Y is less than or equal to M. In this embodiment of this application, the terminal device can send the first failure cause value corresponding to the candidate target cell and/or the second failure cause value corresponding to the to-be-determined cell under a conditional handover mechanism. Therefore, a network side can optimize a handover parameter according to the failure cause values. Therefore, the handover parameter can be optimized under a conditional handover mechanism based on the solution provided in this embodiment of this application.

In a possible design, the terminal device may further send one or more of information about a source cell, information about the candidate target cell, first time information corresponding to each of the at least one candidate target cell, information about the to-be-determined cell, and second time information corresponding to each of the at least one to-be-determined cell. In this embodiment of this application, the terminal device can send one or more of the foregoing information under the conditional handover mechanism. Therefore, the network side can more comprehensively optimize the handover parameter according to different information reported by the terminal device, so that a configured handover parameter is more reasonable in subsequent candidate cell configuration.

In a possible design, if the terminal device successfully accesses a first target cell, the terminal device may further send one or more of information about the first target cell, and a third cause value and third time information that correspond to the first target cell. The first target cell is a cell successfully accessed by the terminal device among the M candidate cells. In this embodiment of this application, the terminal device further sends relevant information generated when a conditional handover succeeds. Therefore, in configuring a candidate cell in a subsequent CHO procedure, the cell to which the conditional handover is successfully performed may be preemptively configured as a candidate cell, so that the conditional handover configuration information configured by the network side is more reasonable. In addition, if the conditional handover mechanism is a backup mechanism of a conventional handover, the relevant information generated when the conditional handover succeeds is reported to a network device so that the network side is aware of no triggering of a conventional handover procedure or is aware that a conventional handover procedure performed by the terminal device according to a conventional handover message fails although the conventional handover procedure is configured by the network side. Therefore, the network side can adjust a relevant parameter in a conventional handover procedure and/or a conditional handover procedure according to the relevant information reported by the terminal device and generated when the conditional handover succeeds. In this way, after triggering the conditional handover procedure, the network side can continue to trigger the conventional handover procedure, thereby improving system reliability.

In a possible design, the terminal device may further receive an RRC reconfiguration message before successfully accessing the first target cell. The RRC reconfiguration message is used to instruct the terminal device to perform a conventional handover. The RRC reconfiguration message contains information about a second target cell. The terminal device accesses the second target cell according to the RRC reconfiguration message; or, the terminal device may determine that the RRC reconfiguration message is not received. In this embodiment of this application, before success of the conditional handover, the terminal device can receive the RRC reconfiguration message that is used to instruct the terminal device to perform a conventional handover, and perform the conventional handover according to the RRC reconfiguration message. Therefore, on the one hand, the conditional handover mechanism serves as a supplementary mechanism to the conventional handover mechanism; on the other hand, a conditional handover can be further performed in case of failure of the conventional handover, thereby making up for a disadvantage of the conventional handover and increasing a handover success rate.

According to a second aspect, an information transmission method and a corresponding communications apparatus are provided. In this solution, a first network device sends conditional handover configuration information to a terminal device. The conditional handover configuration information includes a handover trigger condition and information about M candidate cells, where M is a positive integer. The first network device receives, from a second network device, a first failure cause value corresponding to at least one candidate target cell and/or a second failure cause value corresponding to at least one to-be-determined cell. The at least one candidate target cell includes X cells that meet the handover trigger condition and that the terminal device fails in accessing among the M candidate cells, and the at least one to-be-determined cell includes Y cells that do not meet the handover trigger condition among the M candidate cells. X and Y are natural numbers, and X+Y is less than or equal to M. For the technical effects brought by the second aspect, reference may be made to the technical effects brought by the first aspect, and details are not repeated herein.

In a possible design, the first network device may further receive one or more of the following information from the second network device: information about a source cell, information about the candidate target cell, first time information corresponding to each of the at least one candidate target cell, information about the to-be-determined cell, and second time information corresponding to each of the at least one to-be-determined cell.

In a possible design, the first network device may further receive one or more of the following information from the second network device: information about a first target cell, and a third cause value and third time information that correspond to the first target cell. The first target cell is a cell successfully accessed by the terminal device among the M candidate cells.

In a possible design, the first network device may optimize a handover parameter under a conditional handover mechanism according to the received first failure cause value and/or second failure cause value and one or more of the other information described above. In a possible implementation, if the first network device receives the first failure cause value and/or the second failure cause value, when the first network device subsequently configures a candidate cell, for example, in a next or subsequent CHO procedure, a candidate target cell may be excluded, that is, the candidate target cell is not configured as a candidate cell any more. In this way, in a next or subsequent conditional handover, the terminal device no longer needs to determine whether the candidate target cell meets the handover trigger condition, thereby reducing energy consumption of the terminal device and implementation complexity of the terminal device. Alternatively, if an event A3 is configured in the conditional handover configuration information and a parameter Q is configured for the event A3, the first network device can change a value of the configured parameter Q when subsequently configuring the handover trigger condition. In another possible implementation, for a cell to which a conditional handover has failed (such as a candidate target cell or a to-be-determined cell), if, within a time interval indicated by the first time information, the network device has reconfigured a relevant parameter (using A3 as an example, has reconfigured the parameter R) in a handover trigger condition corresponding to the cell to which the conditional handover has failed, the network device may delete, discard, or ignore the relevant information received from the terminal device and corresponding to the cell to which the conditional handover has failed, and not adjust the relevant parameter in the handover trigger condition corresponding to the cell to which the conditional handover has failed. In another possible implementation, after receiving MRO-related information that includes relevant information about a failure of a conventional handover, the first network device may not configure the second target cell as a candidate cell or a target cell when subsequently configuring a candidate cell. Alternatively, in a subsequent conventional handover procedure, the first network device may adjust a parameter in a relevant event in a measurement configuration. For example, if an event A3 is configured in the measurement configuration and an offset P is configured for the event A3, the first network device can change a value of P to achieve the purpose of optimization.

According to a third aspect, an information transmission method and a corresponding communications apparatus are provided. In this solution, a second network device receives, from a terminal device, a first failure cause value corresponding to at least one candidate target cell and/or a second failure cause value corresponding to at least one to-be-determined cell. The at least one candidate target cell includes X cells that meet a handover trigger condition and that the terminal device fails in accessing among M candidate cells, and the at least one to-be-determined cell includes Y cells that do not meet the handover trigger condition among the M candidate cells. X and Y are natural numbers, X+Y is less than or equal to M, and the M candidate cells and the handover trigger condition are configured through conditional handover configuration information. The second network device sends the first failure cause value and/or the second failure cause value to a first network device. For the technical effects brought by the third aspect, reference may be made to the technical effects brought by the first aspect, and details are not repeated herein.

In a possible design, the second network device may further receive one or more of the following information from the terminal device and send the one or more of the following information to the first network device: information about a source cell, information about the candidate target cell, first time information corresponding to each of the at least one candidate target cell, information about the to-be-determined cell, and second time information corresponding to each of the at least one to-be-determined cell.

In a possible design, the second network device may further receive one or more of the following information from the terminal device and send the one or more of the following information to the first network device: information about a first target cell, and a third cause value and third time information that correspond to the first target cell. The first target cell is a cell successfully accessed by the terminal device among the M candidate cells.

In a possible design, the second network device may optimize a handover parameter under a conditional handover mechanism according to the received first failure cause value and/or second failure cause value and one or more of the other information described above. For a manner of optimizing the handover parameter under the conditional handover mechanism by the second network device, reference may be made to the manner used by the first network device, and details are not repeated herein.

According to a fourth aspect, an information transmission method and a corresponding communications apparatus are provided. In this solution, a first network device sends conditional handover configuration information to a terminal device. The conditional handover configuration information includes a handover trigger condition and information about M candidate cells, where M is a positive integer. A second network device receives, from the terminal device, a first failure cause value corresponding to at least one candidate target cell and/or a second failure cause value corresponding to at least one to-be-determined cell. The second network device sends the first failure cause value and/or the second failure cause value to the first network device. The at least one candidate target cell includes X cells that meet the handover trigger condition and that the terminal device fails in accessing among the M candidate cells, and the at least one to-be-determined cell includes Y cells that do not meet the handover trigger condition among the M candidate cells. X and Y are natural numbers, and X+Y is less than or equal to M. For the technical effects brought by the fourth aspect, reference may be made to the technical effects brought by the first aspect, and details are not repeated herein. With reference to the first aspect, or the second aspect, or the third aspect, or the fourth aspect, in a possible design, the first failure cause value indicates that the candidate target cell meets the handover trigger condition but the terminal device fails in accessing the candidate target cell. Alternatively, the first failure cause value includes a first-level failure cause value and a second-level failure cause value. The first-level failure cause value indicates that a conditional handover of the terminal device fails. The second-level failure cause value indicates that the candidate target cell meets the handover trigger condition but the terminal device fails in accessing the candidate target cell.

With reference to the first aspect, or the second aspect, or the third aspect, or the fourth aspect, in a possible design, the second failure cause value indicates that the to-be-determined cell does not meet the handover trigger condition. Alternatively, the second failure cause value includes a third-level failure cause value and a fourth-level failure cause value. The third-level failure cause value indicates that the conditional handover of the terminal device fails. The fourth-level failure cause value indicates that the to-be-determined cell does not meet the handover trigger condition.

With reference to the first aspect, or the second aspect, or the third aspect, in a possible design, the first time information includes: information about a time interval from a time point at which the terminal device receives the conditional handover configuration information to a time point at which the terminal device triggers a handover to a first candidate target cell, information about a time interval from the time point at which the terminal device triggers the handover to the first candidate target cell to a time point at which the terminal device fails in accessing the first candidate target cell, and information about a time interval from the time point at which the terminal device fails in accessing the first candidate target cell to a time point at which the terminal device sends the first failure cause value and/or the second failure cause value. The first candidate target cell is any one of the at least one candidate target cell.

With reference to the first aspect, or the second aspect, or the third aspect, in a possible design, the second time information includes: information about a time interval from the time point at which the terminal device receives the conditional handover configuration information to a time point at which the terminal device determines that a first to-be-determined cell does not meet the handover trigger condition, and information about a time interval from the time point at which the terminal device determines that the first to-be-determined cell does not meet the handover trigger condition to the time point at which the terminal device sends the first failure cause value and/or the second failure cause value. The first to-be-determined cell is any one of the at least one to-be-determined cell. Alternatively, the second time information includes: information about a time interval from the time point at which the terminal device receives the conditional handover configuration information to a time point at which the terminal device stops assessing whether the first to-be-determined cell meets the handover trigger condition, and information about a time interval from the time point at which the terminal device stops assessing whether the first to-be-determined cell meets the handover trigger condition to the time point at which the terminal device sends the first failure cause value and/or the second failure cause value.

With reference to the first aspect, or the second aspect, or the third aspect, in a possible design, the third cause value indicates that the terminal device successfully performs the conditional handover.

With reference to the first aspect, or the second aspect, or the third aspect, in a possible design, the third time information includes: information about a time interval from the time point at which the terminal device receives the conditional handover configuration information to a time point at which the terminal device triggers a handover to the first target cell, information about a time interval from the time point at which the terminal device triggers the handover to the first target cell to a time point at which the terminal device successfully accesses the first target cell, and information about a time interval from the time point at which the terminal device successfully accesses the first target cell to a time point at which the terminal device sends the one or more of the information about the first target cell, the third cause value, and the third time information.

According to a fifth aspect, a communications apparatus is provided to implement any of the foregoing methods. The communications apparatus may be the terminal device according to the first aspect, or an apparatus that includes the terminal device; or, the communications apparatus may be the first network device according to the second aspect, or an apparatus that includes the first network device; or, the communications apparatus may be the second network device according to the third aspect, or an apparatus that includes the second network device. The communications apparatus includes a module, a unit, or a means for implementing the methods. The module, unit, or means may be implemented by hardware or software, or by corresponding software executed by hardware. The hardware or software includes one or more modules or units corresponding to the functions.

In a sixth aspect, a communications apparatus is provided, including a processor and a memory. The memory is configured to store a computer instruction that, when executed by the processor, causes the communications apparatus to perform the method according to any of the foregoing aspects. The communications apparatus may be the terminal device according to the first aspect, or an apparatus that includes the terminal device; or, the communications apparatus may be the first network device according to the second aspect, or an apparatus that includes the first network device; or, the communications apparatus may be the second network device according to the third aspect, or an apparatus that includes the second network device.

According to a seventh aspect, a communications apparatus is provided, including a processor. The processor is coupled to a memory, and is configured to read an instruction in the memory and perform the method according to any of the foregoing aspects based on the instruction. The communications apparatus may be the terminal device according to the first aspect, or an apparatus that includes the terminal device; or, the communications apparatus may be the first network device according to the second aspect, or an apparatus that includes the first network device; or, the communications apparatus may be the second network device according to the third aspect, or an apparatus that includes the second network device.

According to an eighth aspect, a computer-readable storage medium is provided. The computer-readable storage medium stores an instruction that, when run on a computer, enables the computer to perform the method according to any of the foregoing aspects.

According to a ninth aspect, a computer program product that includes an instruction is provided. When the computer program product runs on a computer, the computer is enabled to perform the method according to any of the foregoing aspects.

According to a tenth aspect, a communications apparatus (for example, the communications apparatus may be a chip or a chip system) is provided. The communications apparatus includes a processor that is configured to implement the functions described in any of the foregoing aspects. In a possible design, the communications apparatus further includes a memory. The memory is configured to store necessary program instructions and data. When the communications apparatus is a chip system, the communications apparatus may include a chip, or may include a chip and another discrete device.

For the technical effects brought by any design according to the fifth aspect to the tenth aspect, reference may be made to the technical effects brought by different designs according to the first aspect, or the second aspect, or the third aspect, or the fourth aspect, and details are not repeated herein.

According to an eleventh aspect, a communications system is provided. The communications system may include the first network device and the second network device according to the fifth aspect to the tenth aspect.

According to a twelfth aspect, a communications system is provided. The communications system may include the first network device, the second network device, and the terminal device according to the fifth aspect to the tenth aspect.

DETAILED DESCRIPTION OF ILLUSTRATIVE EMBODIMENTS

The following describes the technical solutions in the embodiments of this application with reference to the accompanying drawings in the embodiments of this application. In the description of this application, unless otherwise specified, "/" represents an "or" relationship between a preceding object and a following object. For example, "A/B" may represent A or B. The term "and/or" used in this application merely describes an association relationship between associated objects, and represents three possible relationships. For example, "A and/or B" may represent three scenarios: A alone, both A and B, and B alone, where A and B may be singular or plural. In addition, in the description of this application, "a plurality of" means two or more than two. "At least one of (the following)" or a similar expression means any combination of the items mentioned, that is, a combination of one or more of the items. For example, the phrase "at least one of a, b, or c" represents: a, b, c, a&b, a&c, b&c, or a&b&c, where a, b, and c may be singular or plural. In addition, for ease of clearly describing the technical solutions in the embodiments of this application, the items that serve substantially the same functions or bring similar effects are distinguished by the words such as "first" and "second" in the embodiments of this application. A person skilled in the art understands that the words such as "first" and "second" do not limit the quantity or order of operation, and the objects qualified by the words such as "first" and "second" are not necessarily different from each other.

Figure 1:
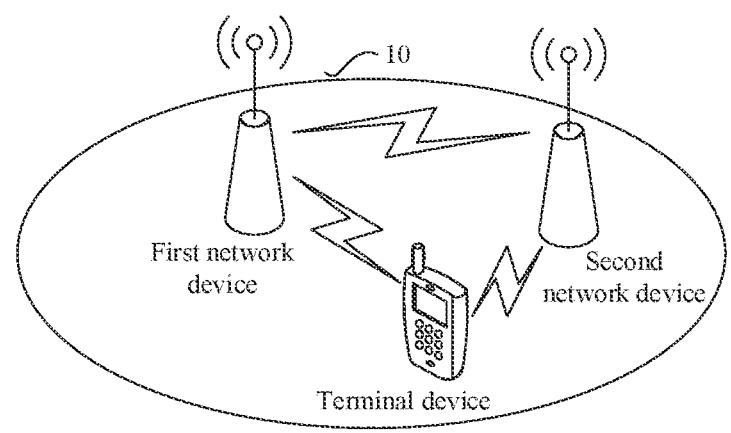
FIG. 1 is a schematic structural diagram of a communications system according to an embodiment of this application.

FIG. 1 shows a communications system 10 according to an embodiment of this application. The communications system 10 includes a terminal device, a first network device, and a second network device.

Using interaction among the terminal device, the first network device, and the second network device shown in FIG. 1 as an example, in this embodiment of this application, the first network device sends conditional handover configuration information to the terminal device. The conditional handover configuration information includes information about candidate cells and a handover trigger condition. After receiving the conditional handover configuration information and performing a conditional handover, the terminal device sends, to the second network device, a first failure cause value corresponding to a candidate target cell and/or a second failure cause value corresponding to a to-be-determined cell during the conditional handover. The candidate target cell is a candidate cell that meets the handover trigger condition. The to-be-determined cell is a candidate cell that does not meet the handover trigger condition. After receiving the first failure cause value and/or the second failure cause value from the terminal device, the second network device sends the first failure cause value and/or the second failure cause value to the first network device. In this way, the first network device or the second network device can optimize a handover parameter according to the failure cause values. Therefore, the handover parameter can be optimized under a conditional handover mechanism based on the solution provided in this embodiment of this application.

Figure 2:
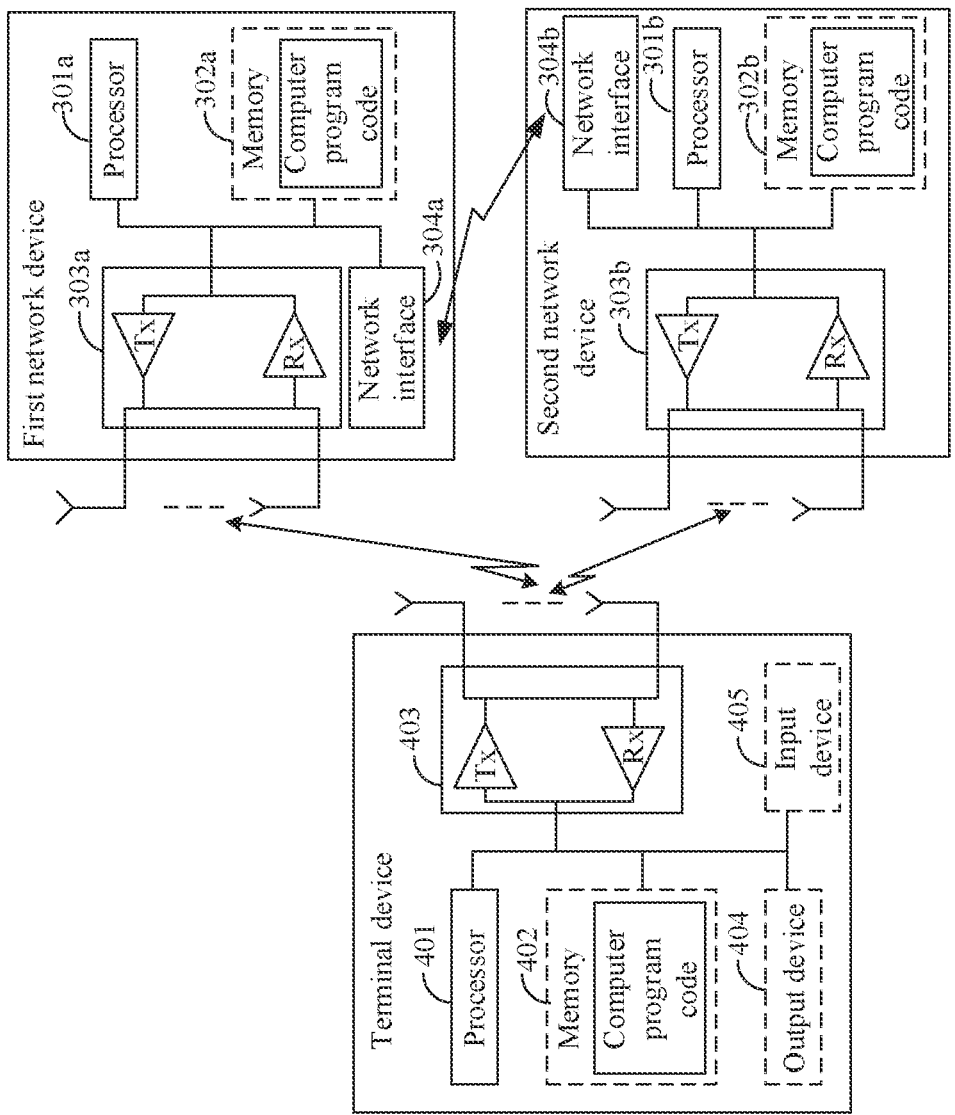
FIG. 2 is a schematic structural diagram of a terminal device and a network device according to an embodiment of this application.

Optionally, FIG. 2 is a schematic structural diagram of a first network device, a second network device, and a terminal device according to an embodiment of this application.

The terminal device includes at least one processor (in FIG. 2, one processor 401 is included as an example) and at least one transceiver (in FIG. 2, one transceiver 403 is included as an example). Optionally, the terminal device may further include at least one memory (in FIG. 2, one memory 402 is included as an example), at least one output device (in FIG. 2, one output device 404 is included as an example), and at least one input device (in FIG. 2, one input device 405 is included as an example).

The processor 401, the memory 402, and the transceiver 403 are connected through a communications line. The communications line may include a path to transmit information among the foregoing components.

The processor 401 may be a general-purpose central processing unit (CPU), a microprocessor, an application-specific integrated circuit (ASIC), or one or more integrated circuits that are configured to control program execution in the solutions provided in this application. In a specific implementation, as an embodiment, the processor 401 may also include a plurality of CPUs, and the processor 401 may be a single-core (single-CPU) processor or a multi-core (multi-CPU) processor. The processor herein may mean one or more devices, circuits, or processing cores that are configured to process data (such as computer program instructions).

The memory 402 may be an apparatus capable of storage. For example, the memory 402 may be, but without limitation, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another optical disc storage, an optional disk storage (including a compact disc, a laser disc, an optical disc, a digital versatile disc, a Blu-ray disc, and the like), a magnetic disk storage medium or another magnetic storage device, or any other medium suitable for carrying or storing desired program code in the form of instructions or data structures and accessible by a computer. The memory 402 may exist independently and be connected to the processor 401 through a communications line. The memory 402 may alternatively be integrated with the processor 401.

The memory 402 is configured to store a computer-executable instruction for performing the solutions of this application, and the execution is controlled by the processor 401. Specifically, the processor 401 is configured to execute the computer-executable instruction stored in the memory 402, so as to implement the information transmission method according to the embodiments of this application. Optionally, the computer-executable instruction in this embodiment of this application is also known as application program code or computer program code. This is not specifically limited in this embodiment of this application.

The transceiver 403 may be any apparatus such as a transceiver, and is configured to communicate with another device or a communications network such as an Ethernet, a radio access network (RAN), or a wireless local area network (WLAN). The transceiver 403 includes a transmitter (Tx) and a receiver (Rx). The transceiver may also be an input/output interface.

The output device 404 communicates with the processor 401, and can display information in diverse forms. For example, the output device 404 may be a liquid crystal display (LCD), a light emitting diode (LED) display device, a cathode ray tube (CRT) display device, or a projector.

The input device 405 communicates with the processor 401, and can receive an input of a user in diverse forms. For example, the input device 405 may be a mouse, a keyboard, a touchscreen device, or a sensor device. The first network device includes one or more processors (in FIG. 2, one processor 301a is included as an example), at least one transceiver (in FIG. 2, one transceiver 303a is included as an example), and at least one network interface (in FIG. 2, one network interface 304a is included as an example). Optionally, the first network device may further include at least one memory (in FIG. 2, one memory 302a is included as an example). The processor 301a, the memory 302a, the transceiver 303a, and the network interface 304a are connected through a communications line. The network interface 304a is configured to connect to a core network device through a link (such as an S1 interface) (where the connection is not shown in FIG. 2), or connect to a network interface of another network device through a wired or wireless link (such as an X2 interface). This is not specifically limited in this embodiment of this application. In addition, for the relevant description of the processor 301a, the memory 302a, and the transceiver 303a, reference may be made to the description of the processor 401, the memory 402, and the transceiver 403 in the terminal device, and details are not repeated herein.

The second network device includes one or more processors (in FIG. 2, one processor 301b is included as an example), at least one transceiver (in FIG. 2, one transceiver 303b is included as an example), and at least one network interface (in FIG. 2, one network interface 304b is included as an example). Optionally, the second network device may further include at least one memory (in FIG. 2, one memory 302b is included as an example). The processor 301b, the memory 302b, the transceiver 303b, and the network interface 304b are connected through a communications line. The network interface 304b is configured to connect to a core network device through a link (such as an S1 interface) (where the connection is not shown in FIG. 2), or connect to a network interface of another network device through a wired or wireless link (such as an X2 interface). This is not specifically limited in this embodiment of this application. In addition, for the relevant description of the processor 301b, the memory 302b, and the transceiver 303b, reference may be made to the description of the processor 401, the memory 402, and the transceiver 403 in the terminal device, and details are not repeated herein.

Figure 3:
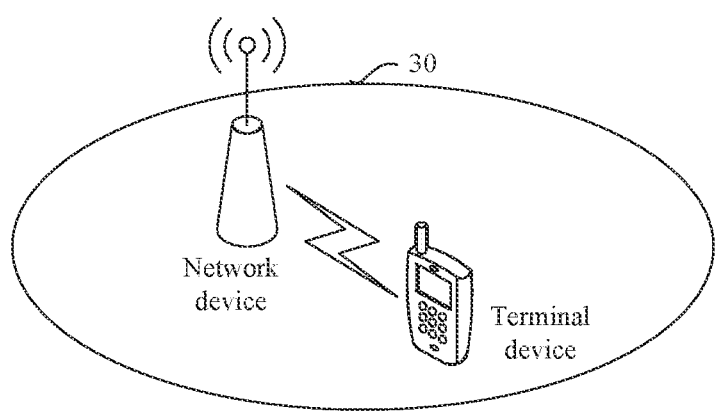
FIG. 3 is a schematic structural diagram of another communications system according to an embodiment of this application.

In another possible implementation, FIG. 3 shows a communications system 30 according to an embodiment of this application. The communications system includes a network device and a terminal device connected to the network device. Optionally, the network device may be connected to a plurality of terminal devices. This is not specifically limited in this application.

Using interaction between the terminal device and the network device shown in FIG. 3 as an example, in this embodiment of this application, the network device sends conditional handover configuration information to the terminal device. The conditional handover configuration information includes information about candidate cells and a handover trigger condition. After receiving the conditional handover configuration information and performing a conditional handover, the terminal device sends, to the network device, a first failure cause value corresponding to a candidate target cell and/or a second failure cause value corresponding to a to-be-determined cell during the conditional handover. The candidate target cell is a candidate cell that meets the handover trigger condition. The to-be-determined cell is a candidate cell that does not meet the handover trigger condition. In this way, the network device can optimize a handover parameter according to the failure cause values. Therefore, the handover parameter can be optimized under a conditional handover mechanism based on the solution provided in this embodiment of this application.

Figure 4:
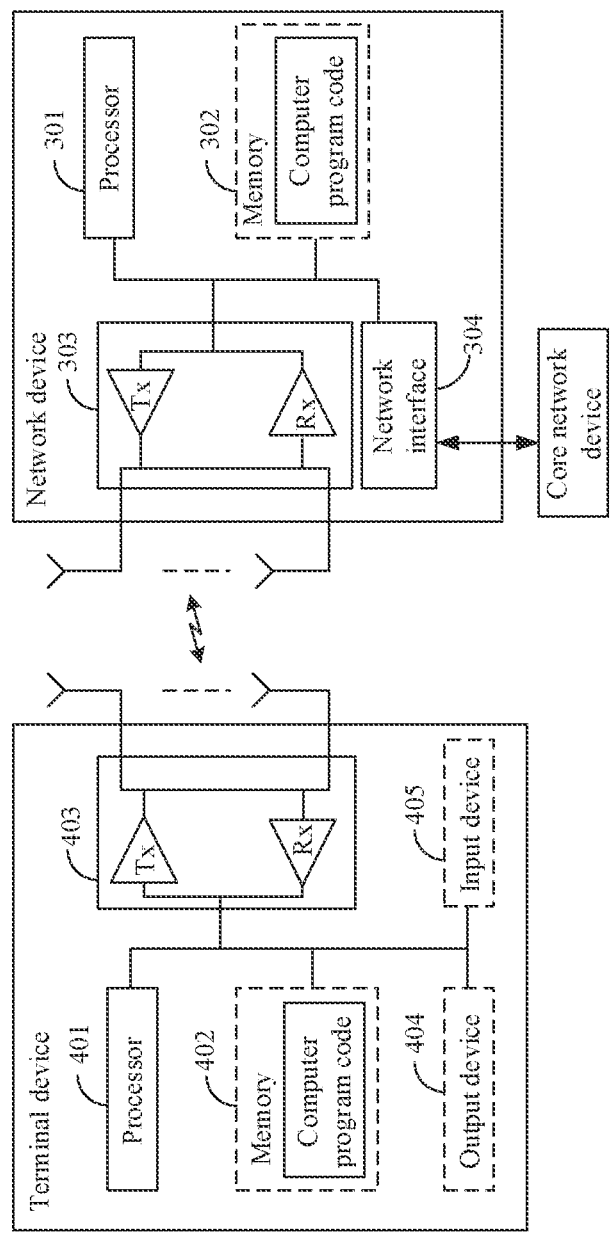
FIG. 4 is a schematic structural diagram of another terminal device and another network device according to an embodiment of this application.

FIG. 4 is a schematic structural diagram of a network device and a terminal device according to an embodiment of this application. For the schematic structural diagram of the terminal device, reference may be made to the schematic structural diagram shown in FIG. 2, and details are not repeated herein.

The network device includes at least one processor (in FIG. 4, one processor 301 is included as an example), at least one transceiver (in FIG. 4, one transceiver 303 is included as an example), and at least one network interface (in FIG. 4, one network interface 304 is included as an example). Optionally, the network device may further include at least one memory (in FIG. 4, one memory 302 is included as an example). The processor 301, the memory 302, the transceiver 303, and the network interface 304 are connected through a communications line. The network interface 304 is configured to connect to a core network device through a link (such as an S1 interface), or connect to a network interface of another network device through a wired or wireless link (such as an X2 interface) (where the connection is not shown in FIG. 4). This is not specifically limited in this embodiment of this application. In addition, for the relevant description of the processor 301, the memory 302, and the transceiver 303, reference may be made to the description of the processor 401, the memory 402, and the transceiver 403 in the terminal device, and details are not repeated herein.

Optionally, the network device (including the first network device or the second network device) and the terminal device in the embodiments of this application may also be referred to as communications apparatuses, and may be general-purpose devices or dedicated devices. This is not specifically limited in the embodiments of this application.

Optionally, the network device (including the first network device or the second network device) in the embodiments of this application is a device that connects the terminal device to a wireless network, and may be an evolved NodeB (evolutional NodeB, eNB or eNodeB) in an LTE system, a base station in a 5G network or a future evolved public land mobile network (PLMN), a broadband network gateway (BNG), an aggregation switch, a non-3rd generation partnership project (3GPP) access device, or the like. This is not specifically limited in the embodiments of this application. Optionally, the base station in the embodiments of this application may include different forms of base stations such as a macro base station, a micro base station (also referred to as a small cell), a relay station, or an access point. This is not specifically limited in the embodiments of this application.

Optionally, the terminal device in the embodiments of this application may be a device that is configured to implement a wireless communication function, such as a terminal or a chip usable in a terminal. The terminal may be user equipment (UE), an access terminal, a terminal unit, a terminal station, a mobile station, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device capable of wireless communication, a computing device, another processing device connected to a wireless modem, a vehicle-mounted device, a wearable device, a virtual reality (VR) terminal device, an augmented reality (AR) terminal device, a wireless terminal in industrial control, a wireless terminal in self-driving, a wireless terminal in remote medical treatment (remote medical), a wireless terminal in a smart grid, a wireless terminal in transportation safety, a wireless terminal in smart city, a wireless terminal in a smart home, or the like. The terminal may be movable or fixed.

Figure 5:
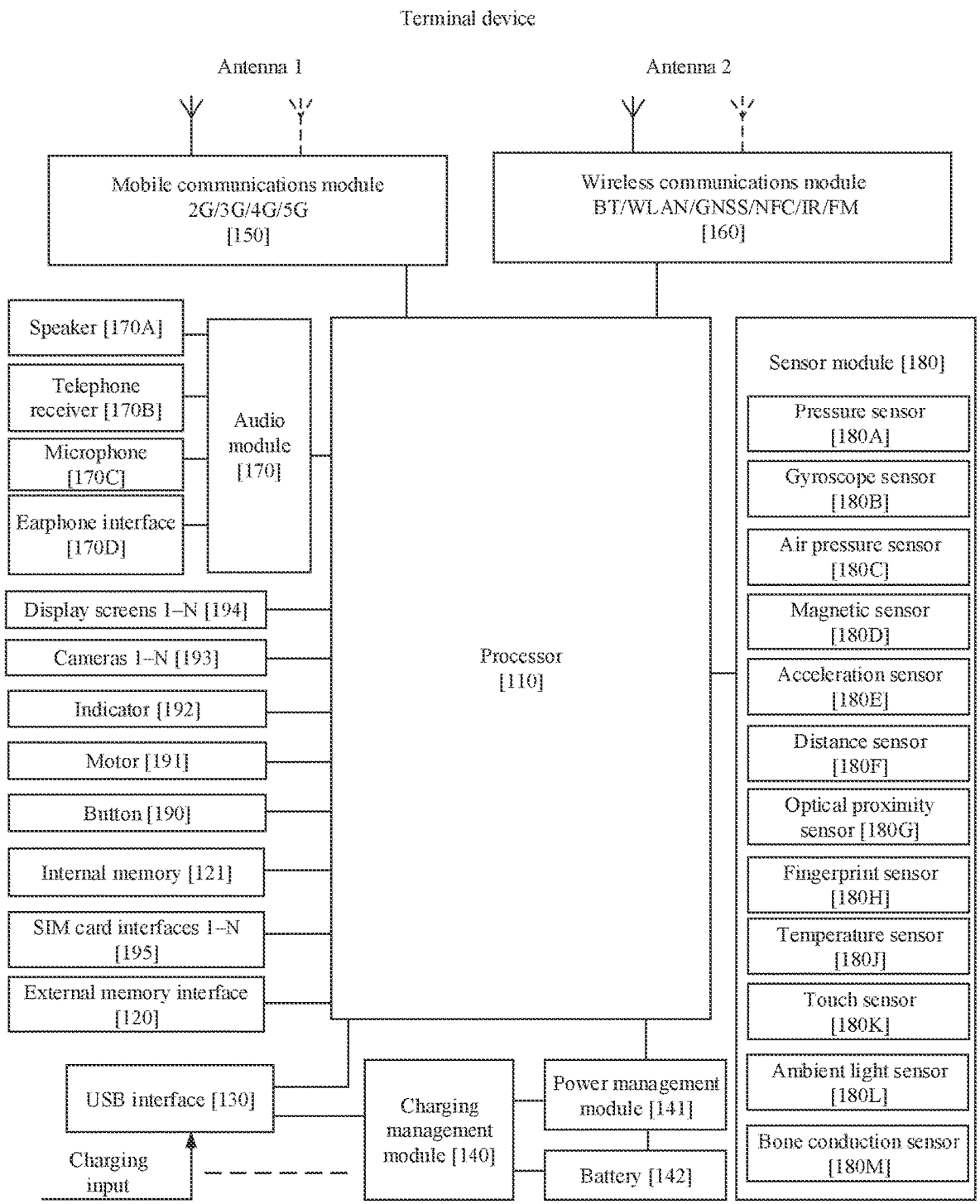
FIG. 5 is another schematic structural diagram of a terminal device according to an embodiment of this application.

With reference to the schematic structural diagram of the terminal device shown in FIG. 2 or FIG. 4, for example, FIG. 5 shows a specific structural form of a terminal device according to an embodiment of the application.

In some embodiments, the functions of the processor 401 in FIG. 2 or FIG. 4 may be implemented by the processor 110 in FIG. 5.

In some embodiments, the functions of the transceiver 403 in FIG. 2 or FIG. 4 may be implemented by an antenna 1, an antenna 2, a mobile communications module 150, a wireless communications module 160, or the like in FIG. 5.

The antenna 1 and the antenna 2 are configured to transmit and receive an electromagnetic-wave signal. Each antenna in the terminal device may be configured to cover one or more communications frequency bands. Different antennas may further be multiplexed to improve a utilization rate of the antennas. For example, the antenna 1 may be multiplexed as a diversity antenna of a wireless local area network. In some other embodiments, the antenna may be used together with a tuning switch.

The mobile communications module 150 may provide a wireless communications solution used in the terminal device and including wireless communication of 2G, 3G, 4G, 5G, and the like. The mobile communications module 150 may include at least one filter, switch, power amplifier, low noise amplifier (LNA), and the like. The mobile communications module 150 may receive an electromagnetic wave through the antenna 1, perform processing such as filtering and amplification on the received electromagnetic wave, and transmit the electromagnetic wave to a modem for demodulation. The mobile communications module 150 may further amplify a signal modulated by the modem, convert the signal into an electromagnetic wave through the antenna 1, and radiate the electromagnetic wave. In some embodiments, at least a part of functional modules of the mobile communications module 150 may be disposed in the processor 110. In some embodiments, at least a part of functional modules of the mobile communications module 150 and at least a part of modules of the processor 110 may be disposed in a same device.

The wireless communications module 160 can provide a wireless communications solution used in the terminal device and including wireless communication of a wireless local area network (WLAN) (such as a Wi-Fi network), Bluetooth (BT), a global navigation satellite system (GNSS), frequency modulation (FM), near field communication (NFC), infrared (IR), and the like. The wireless communications module 160 may be one or more devices integrating at least one communications processing module. The wireless communications module 160 receives an electromagnetic wave through the antenna 2, performs frequency modulation and filtering processing on the electromagnetic-wave signal, and sends the processed signal to the processor 110. The wireless communications module 160 may further receive a to-be-sent signal from the processor 110, perform frequency modulation and amplification on the signal, convert the signal into an electromagnetic wave through the antenna 2, and radiate the electromagnetic wave. When the terminal device is a first device, that the wireless communications module 160 can provide an NFC wireless communications solution used in the terminal device means that the first device includes an NFC chip, and the NFC chip can enhance an NFC wireless communications function. When the terminal device is a second device, that the wireless communications module 160 can provide an NFC wireless communications solution used in the terminal device means that the device includes an electronic tag (such as a radio frequency identification (RFID) tag), and when an NFC chip of another device approaches the electronic tag, the another device can perform NFC wireless communication with the second device.

In some embodiments, the antenna 1 of the terminal device is coupled to the mobile communications module 150, and the antenna 2 is coupled to the wireless communications module 160, so that the terminal device can communicate with a network and other devices through a wireless communications technology. The wireless communications technology may include a global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, or IR technology, or the like. The GNSS may include a global positioning system (GPS), a global navigation satellite system (GLONASS), a BeiDou navigation satellite system (BDS), a quasi-zenith satellite system (QZSS), or satellite based augmentation systems (SBAS).

In some embodiments, the functions of the memory 402 in FIG. 2 or FIG. 4 may be implemented by an internal memory 121 in FIG. 5 or an external memory (such as a microSD card) connected to an external memory interface 120.

In some embodiments, the functions of the output device 404 in FIG. 2 or FIG. 4 may be implemented by a display screen 194 in FIG. 5. The display screen 194 is configured to display an image, a video, and the like. The display screen 194 includes a display panel.

In some embodiments, the functions of the input device 405 in FIG. 2 or FIG. 4 may be implemented by a mouse, a keyboard, a touchscreen device, or a sensor module 180 in FIG. 5. For example, as shown in FIG. 5, the sensor module 180 may include one or more of a pressure sensor 180A, a gyroscope sensor 180B, an air pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, or a bone conduction sensor 180M. This is not specifically limited in this embodiment of this application.

In some embodiments, as shown in FIG. 5, the terminal device may further include one or more of an audio module 170, a camera 193, an indicator 192, a motor 191, a button 190, an SIM card interface 195, a USB interface 130, a charging management module 140, a power management module 141, or a battery 142. The audio module 170 may be connected to a speaker 170A (also referred to as a "loudspeaker"), a telephone receiver 170B (also referred to as a "handset"), a microphone 170C (also referred to as a "mic" or "mike"), an earphone interface 170D, or the like. This is not specifically limited in this embodiment of this application.

Understandably, the structure shown in FIG. 5 does not constitute any specific limitation on the terminal device. For example, in some other embodiments of this application, the terminal device may include more or fewer components than those shown in the figure, or some components may be combined, or some components may be split, or the components may be differently arranged. The illustrated components may be implemented in the form of hardware, software, or a combination of software and hardware.

The following describes in detail an information transmission method in the embodiments of this application, using interaction among the first network device, the second network device, and the terminal device shown in FIG. 1 as an example.

It needs to be noted that the name of a message between network elements or the name of each parameter in a message in embodiments of this application is merely an example. In specific implementations, other names may apply instead. This is not specifically limited in this embodiment of this application.

Figure 6:
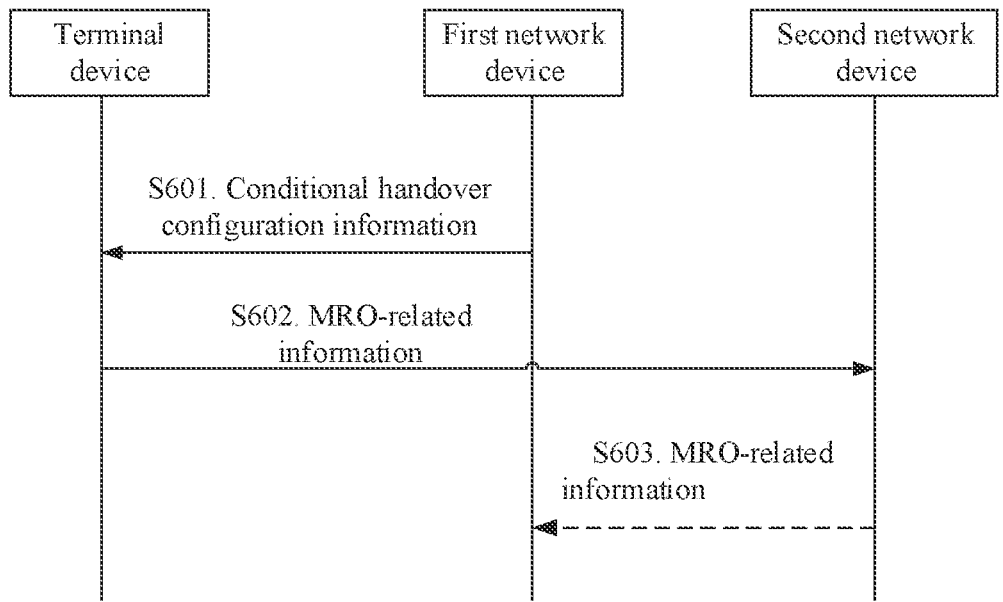
FIG. 6 is a schematic flowchart of an information transmission method according to an embodiment of this application.

FIG. 6 shows an information transmission method according to this embodiment of this application. The information transmission method includes the following steps.

S601. The first network device sends a message 1 to the terminal device.

The message 1 may include conditional handover configuration information. The conditional handover configuration information includes a handover trigger condition and information about M candidate cells. The first network device may be referred to as a source network device. That is, the first network device is a network device to which a source cell belongs. M is a positive integer. In other words, the message 1 may include information about one or more candidate cells. Understandably, the handover trigger condition and the information about the M candidate cells may be sent in the same message, or in different messages. This is not limited in this embodiment of this application.

Optionally, the conditional handover configuration information may further include information required for random access performed by the terminal device to access any one or more of the M candidate cells. The terminal device may initiate contention-free access to the candidate cell based on the information.

After receiving the message 1 sent by the first network device, the terminal device may determine, based on the conditional handover configuration information included in the message 1, whether any one of the M candidate cells meets the handover trigger condition, so as to determine at least one candidate target cell and/or at least one to-be-determined cell. The at least one candidate target cell includes X cells that meet the handover trigger condition and that the terminal device fails in accessing among the M candidate cells, and the at least one to-be-determined cell includes Y cells that do not meet the handover trigger condition among the M candidate cells. X is any natural number less than or equal to M, Y is any natural number less than or equal to M, and X+Y is less than or equal to M.

It needs to be noted that, unless otherwise specified in this embodiment of this application, an access failure means that the terminal device fails in accessing a cell. For example, a random access procedure performed by the terminal device for a cell fails. Alternatively, an access failure means that an RLF occurs in a cell successfully accessed by the terminal device. For example, the terminal device succeeds in random access to a cell, but an RLF occurs in the cell within a preset time after the successful access of the terminal device. For example, the RLF occurs X seconds after the terminal device successfully accesses a cell, where X may be specified by a protocol or configured by a network. This is not specifically limited in this application.

S602. The terminal device sends MRO-related information to the second network device.

Optionally, in a CHO procedure in this embodiment of this application, a terminal device with a related capability, such as a terminal device capable of recording MRO-related information, may further record MRO-related information of one or more candidate cells. Therefore, the terminal device may send the MRO-related information to the second network device.

Optionally, in this embodiment of this application, the terminal device may send the MRO-related information to the second network device through an RRC message. For example, the RRC message may be a UE information response (UEInformationResponse) message, or another RRC message or another form of message. This is not specifically limited in this application.

Optionally, in this embodiment of this application, the second network device may request or trigger the terminal device to send the MRO-related information, or the terminal device may trigger the sending of the MRO-related information (for example, the terminal device sends the MRO-related information periodically or based on an event). This is not specifically limited in this embodiment of this application.

Optionally, in this embodiment of this application, after receiving a message that includes the MRO-related information from the terminal device, the second network device may forward the message to the first network device, so that the first network device adjusts a conditional handover-related parameter. Alternatively, the second network device may forward the message to a network device to which a corresponding candidate cell belongs as indicated in the MRO-related information, so that the network device to which the corresponding candidate cell belongs adjusts a conditional handover-related parameter. Alternatively, the second network device may adjust, based on content in the message, a conditional handover-related parameter. For example, when the corresponding candidate cell included in the MRO information belongs to the second network device, the second network device may adjust the conditional handover-related parameter. Optionally, after performing corresponding processing (such as optimization of the conditional handover parameter), the second network device may send a processing result to the first network device or the network device to which the corresponding candidate cell belongs as indicated in the MRO-related information. This is not specifically limited in this embodiment of this application.

After receiving the message that includes the MRO-related information from the terminal device, the second network device performs step S603 if determining to forward the message to the first network device.

S603. The second network device sends the MRO-related information to the first network device.

Optionally, in this embodiment of this application, the second network device and the first network device may be the same network device. In this case, step S603 does not need to be performed. Alternatively, the second network device and the first network device may be different network devices. In this case, step S603 needs to be performed.

In steps S601 to S603:

The MRO-related information in this embodiment of this application includes a first failure cause value corresponding to the candidate target cell and/or a second failure cause value corresponding to the to-be-determined cell.

For example, if a candidate target cell exists but no to-be-determined cell exists, the MRO-related information in this embodiment of this application includes the first failure cause value corresponding to the candidate target cell. Alternatively, if a to-be-determined cell exists but no candidate target cell exists, the MRO-related information in this embodiment of this application includes the second failure cause value corresponding to the to-be-determined cell. Alternatively, if both a candidate target cell and a to-be-determined cell exist, the MRO-related information in this embodiment of this application includes both the first failure cause value corresponding to the candidate target cell and the second failure cause value corresponding to the to-be-determined cell.

Optionally, in this embodiment of this application, the first failure cause value indicates that the candidate target cell meets the handover trigger condition but the terminal device fails in accessing the candidate target cell. Alternatively, the first failure cause value includes two levels of cause values such as a first-level failure cause value and a second-level failure cause value. The first-level failure cause value indicates that a conditional handover of the terminal device fails, and the second-level failure cause value indicates that the candidate target cell meets the handover trigger condition but the terminal device fails in accessing the candidate target cell.

Optionally, in this embodiment of this application, for the second-level failure cause value, a possible form of representation is that a new cause value is introduced to indicate that the candidate target cell meets the handover trigger condition but the terminal device fails in accessing the candidate target cell. For example, the second-level failure cause value may be represented by ConditionTriggerButAccessFailure, or the second-level failure cause value may be represented in other forms. This is not specifically limited in this embodiment of this application. Another possible form of representation is to reuse an existing handover failure (HOF) cause value or an RLF cause value. For example, an existing HOF may be reused. Specifically, the HOF cause value may be redefined to indicate that a cell meets the handover trigger condition but the terminal device fails in accessing the cell. Optionally, in this embodiment of this application, a correspondence between the candidate target cell and the first failure cause value may be: each candidate target cell corresponds to one first failure cause value; or, a plurality of candidate target cells correspond to a same first failure cause value. In an example, a source cell is a cell A; the conditional handover configuration information includes 3 candidate cells: a cell B, a cell C, and a cell D; the cell B, the cell C, and the cell D are candidate target cells that meet the handover trigger condition; and the terminal device fails in accessing the cell B, the cell C, and the cell D. Therefore, the correspondence between the candidate target cell and the first failure cause value may be: the cell B corresponds to a first failure cause value 1, the cell C corresponds to a first failure cause value 2, and the cell D corresponds to a first failure cause value 3; or, the cell B and the cell C jointly correspond to a first failure cause value 4, and the cell D corresponds to a first failure cause value 5; or, the cell B, the cell C, and the cell D jointly correspond to a first failure cause value 6.

Optionally, in this embodiment of this application, the second failure cause value indicates that the to-be-determined cell does not meet the handover trigger condition. Alternatively, the second failure cause value includes two levels of cause values such as a third-level failure cause value and a fourth-level failure cause value. The third-level failure cause value indicates that the conditional handover of the terminal device fails. The fourth-level failure cause value indicates that the to-be-determined cell does not meet the handover trigger condition.

Optionally, in this embodiment of this application, for the fourth-level failure cause value, a possible form of representation may be that a new cause value is introduced to indicate that the to-be-determined cell does not meet the handover trigger condition. For example, the fourth-level failure cause value may be represented by ConditionNotTrigger, or the fourth-level failure cause value may be represented in other forms. This is not specifically limited in this embodiment of this application. Another possible form of representation is to reuse an existing HOF cause value or an RLF cause value. For example, an RLF may be reused. Specifically, the RLF cause value may be redefined to indicate that a cell does not meet the handover trigger condition.

Optionally, in this embodiment of this application, a correspondence between the to-be-determined cell and the second failure cause value may be: each to-be-determined cell corresponds to one second failure cause value; or, a plurality of to-be-determined cells correspond to a same second failure cause value. The specific correspondence is similar to the correspondence between the candidate target cell and the first failure cause value. For details, reference may be made to the description of the correspondence between the candidate target cell and the first failure cause value, and details are not repeated herein.

Optionally, in this embodiment of this application, the MRO-related information further includes first information. The first information includes one or more of the following information: information about the source cell, information about the candidate target cell, first time information corresponding to each of the at least one candidate target cell, information about the to-be-determined cell, and second time information corresponding to each of the at least one to-be-determined cell. The information about the source cell includes cell identity information of the source cell and/or cell signal quality information of the source cell. The information about the candidate target cell includes cell identity information of the candidate target cell and/or cell signal quality information of the candidate target cell. The information about the to-be-determined cell includes cell identity information of the to-be-determined cell and/or cell signal quality information of the to-be-determined cell. Specifically, the cell identity information may include a PCI and frequency information corresponding to the cell, and/or, a cell global identity CGI. For example, the PCI and the frequency information corresponding to the cell may be used as an identity of the cell, or the CGI may be used as the identity of the cell. The frequency information includes one or more of: an absolute frequency of a synchronization signal block (such as absoluteFrequencySSB), an absolute frequency position (such as absoluteFrequencyPointA) of a reference resource module (a common RB o), a frequency bandwidth list (such as frequencyBandList), a subcarrier spacing (SCS), and an SCS-specific carrier list (such as scs-SpecificCarrierList). The cell signal quality information includes a reference signal received power (RSRP) of the cell, and/or, reference signal received quality (RSRQ).

Optionally, the cell signal quality information may further include a signal quality change rate of the cell.

Optionally, in this embodiment of this application, the first time information includes: information about a time interval from a time point at which the terminal device receives the conditional handover configuration information to a time point at which the terminal device triggers a handover to a first candidate target cell, information about a time interval from the time point at which the terminal device triggers the handover to the first candidate target cell to a time point at which the terminal device fails in accessing the first candidate target cell, and information about a time interval from the time point at which the terminal device fails in accessing the first candidate target cell to a time point at which the terminal device sends a first failure cause value corresponding to the first candidate target cell (or, information about a time interval from the time point at which the terminal device fails in accessing the first candidate target cell to a time point at which the terminal device sends the first information). The first candidate target cell is any one of the at least one candidate target cell.

It needs to be noted that in this embodiment of this application, the time point of triggering the handover to the first candidate target cell means a time point at which the terminal device determines that the first candidate target cell meets the handover trigger condition; or, the time point of triggering the handover to the first candidate target cell means a time point at which the terminal device initiates access to the first candidate target cell. The access may be contention-free access or contention access. For example, the time point of triggering the handover to the first candidate target cell means a time point at which the terminal device initiates random access to the first candidate target cell, for example, a time point at which the terminal device sends a preamble sequence to the first candidate target cell.

Alternatively, in a possible implementation, the first time information includes: information about a time interval from a time point at which the terminal device receives the conditional handover configuration information to a time point at which the terminal device triggers a handover to a first candidate target cell, and information about a time interval from the time point at which the terminal device triggers the handover to the first candidate target cell to a time point at which the terminal device sends a first failure cause value corresponding to the first candidate target cell (or, information about a time interval from the time point at which the terminal device triggers the handover to the first candidate target cell to a time point at which the terminal device sends the first information). Alternatively, in another possible implementation, the first time information includes: information about a time interval from a time point at which the terminal device receives the conditional handover configuration information to a time point at which the terminal device fails in accessing a first candidate target cell, and information about a time interval from the time point at which the terminal device fails in accessing the first candidate target cell to a time point at which the terminal device sends a first failure cause value corresponding to the first candidate target cell (or, information about a time interval from the time point at which the terminal device fails in accessing the first candidate target cell to a time point at which the terminal device sends the first information).

Alternatively, in still another possible implementation, the first time information is: information about a time interval from a time point at which the terminal device receives the conditional handover configuration information to a time point at which the terminal device sends a first failure cause value corresponding to a first candidate target cell; or, information about a time interval from a time point at which the terminal device receives the conditional handover configuration information to a time point at which the terminal device sends the first information.

Optionally, in this embodiment of this application, the second time information includes: information about a time interval from the time point at which the terminal device receives the conditional handover configuration information to a time point at which the terminal device determines that a first to-be-determined cell does not meet the handover trigger condition, and information about a time interval from the time point at which the terminal device determines that the first to-be-determined cell does not meet the handover trigger condition to a time point at which the terminal device sends a second failure cause value corresponding to the first to-be-determined cell (or, information about a time interval from the time point at which the terminal device determines that the first to-be-determined cell does not meet the handover trigger condition to the time point at which the terminal device sends the first information). The first to-be-determined cell is any one of the at least one to-be-determined cell.

Alternatively, in another possible implementation, the second time information includes: information about a time interval from the time point at which the terminal device receives the conditional handover configuration information to a time point at which the terminal device stops assessing whether a first to-be-determined cell meets the handover trigger condition, and information about a time interval from the time point at which the terminal device stops assessing whether the first to-be-determined cell meets the handover trigger condition to a time point at which the terminal device sends a second failure cause value corresponding to the first to-be-determined cell (or, information about a time interval from the time point at which the terminal device stops assessing whether the first to-be-determined cell meets the handover trigger condition to the time point at which the terminal device sends the first information). For example, the time point at which the terminal device stops assessing whether the first to-be-determined cell meets the handover trigger condition in the second time information is a time point at which, in a case of determining "by polling", the terminal device stops determining repeatedly whether the first to-be-determined cell meets the handover trigger condition.

Alternatively, in still another possible implementation, the second time information is information about a time interval from the time point at which the terminal device receives the conditional handover configuration information to a time point at which the terminal device sends a second failure cause value corresponding to a first to-be-determined cell; or, the second time information is information about a time interval from the time point at which the terminal device receives the conditional handover configuration information to a time point at which the terminal device sends the first information.

Optionally, in this embodiment of this application, the first information may further include information about a cell successfully accessed by the terminal device currently after receipt of the conditional handover configuration information, that is, information about a cell that ultimately serves the terminal device in this CHO procedure. Alternatively, as understood in a different way, the information about the successfully accessed cell is information about a cell that ultimately holds (or establishes or maintains) an RRC connection to the terminal device in this CHO procedure. The information about the cell includes cell identity information and/or cell signal quality information. For the description of the cell identity information and the cell signal quality information, reference may be made to the foregoing described cell identity information and cell signal quality information, and details are not repeated herein. For example, the terminal device may record information about the cell C if: the source cell is the cell A; two candidate cells, that is, the cell B and the cell C, are configured in the conditional handover configuration information; and the terminal device determines, based on the conditional handover configuration information, that the cell C meets the handover trigger condition, and the terminal device successfully accesses the cell C. Alternatively, in another example, the terminal device initiates a re-establishment procedure and the re-establishment succeeds, and therefore, the terminal device may record information about a cell to which an RRC connection is re-established (for example, if the terminal device initiates a procedure of re-establishing an RRC connection to a cell E and the RRC connection to the cell E is re-established successfully, the terminal device may record information about the cell E). The cell to which the RRC connection is re-established may be one of the M candidate cells or a cell other than the M candidate cells. The re-establishment procedure is initiated if: the terminal device determines, based on the currently received conditional handover configuration information, that none of the configured M candidate cells meets the handover trigger condition; or, the terminal device fails in accessing all candidate target cells among the configured M candidate cells; or, another circumstance occurs. Alternatively, in another example, the terminal device determines, based on the currently received conditional handover configuration information, that none of the configured M candidate cells meets the handover trigger condition; or, the terminal device fails in accessing all candidate target cells among the configured M candidate cells; or, another circumstance occurs; and, in this case, signal quality of the source cell is still relatively good, and an RRC connection is still kept between the terminal device and the source cell (or a source network device), and therefore, the terminal device may record the information about the source cell, that is, the terminal device may record information about the cell A.

Generally, a cell includes a downlink carrier and an uplink carrier. However, when a 5G new radio (NR) communications system deploys a high-band cell, due to a relatively high NR running band and a relatively low transmit power of a terminal device, a terminal device located at an edge of the cell can receive a signal from a network device (such as a base station), but the network device cannot receive a signal from the terminal device. That is, uplink coverage and downlink coverage are asymmetrical. To resolve this problem, another low band (such as an LTE band) is introduced to assist the terminal device in uplink transmission. Specifically, a supplementary uplink (SUL) is introduced. Therefore, the terminal device is provided with two uplink (UL) carrier spectrum bands for uplink transmission. A cell that supports an SUL configuration is provided with one downlink carrier and two uplink carriers. To distinguish between the two uplink carriers, one is referred to as an SUL carrier, and the other is referred to as a normal uplink (NUL) carrier. Optionally, in this embodiment of this application, if the candidate target cell supports the SUL configuration, when the terminal device fails in accessing the candidate target cell that supports the SUL configuration, the first information may further include UL carrier information (such as a NUL or an SUL) that is used by the terminal device when the terminal device fails in accessing the candidate target cell, so as to indicate whether the terminal device fails in NUL or SUL access to the candidate target cell. Alternatively, the terminal device may skip explicitly sending the carrier information. For example, a protocol stipulates that when the terminal device sends no carrier information, it is considered by default that the terminal device fails in NUL access to the candidate target cell or fails in SUL access to the candidate target cell. This is not specifically limited in this application.

Optionally, in this embodiment of this application, the MRO-related information further includes second information. The second information is information about a cell when the terminal device successfully performs a conditional handover. The second information includes one or more of the following information:

information about a first target cell, and a third cause value and third time information that correspond to the first target cell, where the first target cell is a cell meeting the handover trigger condition and successfully accessed by the terminal device among the candidate cells. It needs to be noted that, if the cell that ultimately serves the terminal device in this CHO procedure is the cell meeting the handover trigger condition and successfully accessed by the terminal device among the candidate cells (or, as understood in a different way, a cell to which the terminal device successfully performs a conditional handover in this CHO procedure), the information about the cell that ultimately serves the terminal device in this CHO procedure as recorded by the terminal device is the same as the information about the first target cell in this CHO procedure as recorded by the terminal device. To avoid storage overheads, the terminal device may record only one of the two pieces of the information that are the same, or, as understood in a different way, the second information may exclude the information about the first target cell, or the first information may exclude the information about the cell that ultimately serves the terminal device in this CHO procedure.

The third cause value corresponding to the first target cell indicates that the terminal device successfully performs the conditional handover. The third time information includes: information about a time interval from the time point at which the terminal device receives the conditional handover configuration information to a time point at which the terminal device triggers a handover to the first target cell, information about a time interval from the time point at which the terminal device triggers the handover to the first target cell to a time point at which the terminal device successfully accesses the first target cell, and information about a time interval from the time point at which the terminal device successfully accesses the first target cell to a time point at which the terminal device sends the third cause value corresponding to the first target cell (or, information about a time interval from the time point at which the terminal device successfully accesses the first target cell to the time point at which the terminal device sends the first information; or, information about a time interval from the time point at which the terminal device successfully accesses the first target cell to a time point at which the terminal device sends the second information).

It needs to be noted that in this embodiment of this application, the time point of triggering the handover to the first target cell means a time point at which the terminal device determines that the first target cell meets the handover trigger condition; or, the time point of triggering the handover to the first target cell means a time point at which the terminal device initiates access to the first target cell. The access may be contention-free access or contention access. For example, the time point of triggering the handover to the first candidate target cell means a time point at which the terminal device initiates random access to the first candidate target cell, for example, a time point at which the terminal device sends a preamble sequence to the first target cell.

Alternatively, in another possible implementation, the third time information corresponding to the first target cell includes: information about a time interval from the time point at which the terminal device receives the conditional handover configuration information to a time point at which the terminal device successfully accesses the first target cell, and information about a time interval from the time point at which the terminal device successfully accesses the first target cell to a time point at which the terminal device sends the third cause value corresponding to the first target cell (or, information about a time interval from the time point at which the terminal device successfully accesses the first target cell to the time point at which the terminal device sends the first information; or, information about a time interval from the time point at which the terminal device successfully accesses the first target cell to the time point at which the terminal device sends the second information).

Alternatively, in another possible implementation, the third time information corresponding to the first target cell includes: information about a time interval from the time point at which the terminal device receives the conditional handover configuration information to a time point at which the terminal device triggers a handover to the first target cell, and information about a time interval from the time point at which the terminal device triggers the handover to the first target cell to a time point at which the terminal device sends the third cause value corresponding to the first target cell (or, information about a time interval from the time point at which the terminal device triggers the handover to the first target cell to the time point at which the terminal device sends the first information; or, information about a time interval from the time point at which the terminal device successfully accesses the first target cell to the time point at which the terminal device sends the second information). Alternatively, the third time information corresponding to the first target cell is information about a time interval from the time point at which the terminal device receives the conditional handover configuration information to a time point at which the terminal device sends the third cause value corresponding to the first target cell (or, the third time information corresponding to the first target cell is information about a time interval from the time point at which the terminal device receives the conditional handover configuration information to the time point at which the terminal device sends the first information; or, information about a time interval from the time point at which the terminal device successfully accesses the first target cell to the time point at which the terminal device sends the second information).

Optionally, in this embodiment of this application, a conditional handover mechanism may be used as a supplementary technology to a conventional handover mechanism. In other words, the source network device (that is, the first network device) sends the conditional handover configuration information to the terminal device when a source link is of relatively high quality. Subsequently, the source network device may further send a handover message to the terminal device according to the existing conventional handover mechanism (in this embodiment of this application, the handover message sent to the terminal device according to the conventional handover mechanism may be referred to as a conventional handover message). The conventional handover message in an NR system may be an RRC reconfiguration message that includes a reconfiguration-with-sync information element, or, the conventional handover message in an LTE system may be an RRC connection reconfiguration message that includes a mobility control information element. This is not specifically limited in this embodiment of this application. The conventional handover message contains information about a second target cell. For example, the information about the second target cell includes cell identity information of the second target cell, a C-RNTI allocated by the second target cell to the terminal device, a random access configuration associated with the second target cell, and the like. The conventional handover message may be an RRC reconfiguration message that carries a reconfiguration-with-sync information element, or an RRC connection reconfiguration message that carries a mobility control information element. This is not specifically limited in this application.

When the conditional handover mechanism is used as a supplementary technology to the conventional handover mechanism, a possible scenario 1 is: After receiving the conditional handover configuration information, the terminal device determines whether a candidate cell meets the handover trigger condition; if the terminal receives a conventional handover message before a cell meeting the handover trigger condition is determined or before the terminal device successfully accesses a cell meeting the handover trigger condition that has been determined, the terminal device may attempt to access the second target cell according to the conventional handover message. If the terminal device successfully accesses the second target cell, optionally, the terminal device may discard or delete the conditional handover configuration information. If the terminal device fails in accessing the second target cell, the terminal device may continue to perform the conditional handover according to the conditional handover configuration information.

When the conditional handover mechanism is used as a supplementary technology to the conventional handover mechanism, another possible scenario 2 is: After receiving the conditional handover configuration information, the terminal device determines a cell meeting the handover trigger condition and successfully hands over to the cell. That is, before the terminal device successfully hands over to the cell meeting the handover trigger condition, the source network device sends no conventional handover message to the terminal device; or, the source network device sends a conventional handover message to the terminal device but the terminal device fails in receiving the conventional handover message sent by the source network device. In this case, the terminal device may perform the conditional handover according to the conditional handover configuration information. A possible cause for the failure of the terminal device to receive the conventional handover message is that the source link is of relatively low quality. A possible cause for the source network device sending no conventional handover message to the terminal device is that a preparation procedure for a handover between the source network device and a network device to which the determined second target cell belongs fails or consumes too long a time, and consequently the network is too late in configuring or fails in configuring a conventional handover procedure. This is not specifically limited in this embodiment of this application.

Optionally, in this embodiment of this application, in the possible scenario 1, if the terminal device receives the conventional handover message from the source network device but fails in accessing the second target cell indicated in the conventional handover message, the MRO-related information may further include third information. The third information is information about a handover failure, or in other words, information about a conventional handover failure. The third information may include one or more of: the information about the source cell, information about the second target cell, a fourth failure cause value, fourth time information, and first indication information. The first indication information indicates that the terminal device has received the handover message. The information about the second target cell includes cell identity information of the second target cell and/or cell signal quality information of the second target cell. The fourth failure cause value indicates that the terminal device fails in performing a conventional handover or fails in accessing the second target cell. For example, the fourth failure cause value may be a HOF, that is, an existing failure cause value HOF is reused, to indicate that the conventional handover fails or the access to the second target cell fails. This is not specifically limited in this application. The fourth time information includes: information about a time interval from a time point at which the terminal device receives the handover message to a time point at which the terminal device fails in accessing the second target cell, and information about a time interval from the time point at which the terminal device fails in accessing the second target cell to a time point at which the terminal device sends the third information. Alternatively, the fourth time information includes information about a time interval from a time point at which the terminal device receives the handover message to a time point at which the terminal device sends the third information. The first indication information may be a binary value. For example, "1" means that the terminal device has received the handover message. Alternatively, the first indication information may be a Boolean value. For example, "TRUE" means that the terminal device has received the handover message. Alternatively, the first indication information may be an information element. For example, the information element may be an indication of receipt of the conventional handover message (such as HO-received), or the information element may be represented or named in other forms. This is not specifically limited in this embodiment of this application. When the terminal device reports the information element, it indicates that the terminal device has received the conventional handover message. If the terminal device does not report the information element, it indicates that the terminal device receives no conventional handover message. This application does not specifically limit the representation form of the first indication information. Because the terminal device fails in performing the conventional handover according to the conventional handover message, the terminal device may continue to determine, based on the conditional handover configuration information received before the handover message, whether the candidate cells meet the handover trigger condition. When a candidate target cell and/or a to-be-determined cell exist/exists in the candidate cells, the terminal device may record and report information about the candidate target cell and/or the to-be-determined cell. For details, refer to the foregoing description, and details are not repeated herein.

Optionally, in this embodiment of this application, in the possible scenario 2, if the terminal device receives no conventional handover message from the source network device, the MRO-related information may further include fourth information. The fourth information is information about a handover failure, or in other words, information about a conventional handover failure. The fourth information may include one or more of: the information about the source cell, fifth time information, and second indication information. The second indication information indicates that the terminal device receives no handover message. The fifth time information includes information about a time interval from a time point at which an RLF occurs between the terminal device and the source network device to a time point at which the terminal device sends the fourth information. The second indication information may be a binary value. For example, "0" means that the terminal device receives no handover message. Alternatively, the second indication information may be a Boolean value. For example, "FALSE" means that the terminal device receives no handover message. Alternatively, the second indication information may be an information element. For example, the information element may be an indication of no receipt of the conventional handover message (such as HO-notreceived), or the information element may be represented or named in other forms. This is not limited herein. When the terminal device reports the information element, it indicates that the terminal device receives no conventional handover message. If the terminal device does not report the information element, it indicates that the terminal device has received the conventional handover message. This application does not specifically limit the representation form of the second indication information. Because the terminal device receives no conventional handover message, the terminal device determines, based on the received conditional handover configuration, whether the candidate cells meet the handover trigger condition. When a candidate target cell and/or a to-be-determined cell exist/exists in the candidate cells, the terminal device may record and report information about the candidate target cell and/or the to-be-determined cell. For details, refer to the foregoing description, and details are not repeated herein.

In step S601:

Optionally, the message 1 may be an RRC reconfiguration message that carries a reconfiguration-with-sync (reconfiguration with sync) information element; or, the message 1 may be a newly defined RRC message, for example, the message 1 is a conditional handover message, or the message 1 is named in other forms; or, the message 1 may be an RRC connection reconfiguration message that carries a mobility control info information element. This is not specifically limited in this embodiment of this application.

Optionally, in this embodiment of this application, information about each of the M candidate cells may include one or more of the following information: a cell identity (such as a PCI and frequency information corresponding to the cell, and/or a cell global identity (CGI) corresponding to the candidate cell, where for example, the PCI and the frequency information corresponding to the cell may be used as the cell identity, or the CGI may be used as the cell identity), a cell radio network temporary identifier (C-RNTI) allocated by the candidate cell to the terminal device, and a random access channel (RACH) resource associated with the candidate cell. For example, the random access channel RACH resource may include a dedicated random access resource and/or common random access resource. The dedicated random access resource includes a preamble index and a first time-frequency resource. The common random access resource includes a second time-frequency resource. The frequency information includes one or more of: an absolute frequency of a synchronization signal block SSB (such as absoluteFrequencySSB), an absolute frequency position (such as absoluteFrequencyPointA) of a reference resource module (a common RB o), a frequency bandwidth list (such as frequencyBandList), a subcarrier spacing (such as a subcarrier spacing, SCS), and an SCS-specific carrier list (such as scs-SpecificCarrierList).

In this embodiment of this application, the handover trigger condition is used for the terminal device to determine whether a handover can be triggered to any one of the M candidate cells. Optionally, there are a plurality of possible configurations of the handover trigger condition in the conditional handover configuration information.

For example, a possible configuration of the handover trigger condition is to configure an event A3 as a handover trigger event, and configure a parameter Q for the event A3. Therefore, when signal quality of a cell among the M candidate cells is higher than signal quality of a current serving cell of the terminal device by Q, the cell meets the handover trigger condition. It can be seen that Q is a threshold, and the unit of Q may be decibel (dB) or decibel milliwatt (dBm). This is not specifically limited in this embodiment of this application.

Alternatively, another possible configuration of the handover trigger condition is to configure an event A5 as a handover trigger event, and configure parameters K and L for the event A5. Therefore, when signal quality of a cell among the M candidate cells is higher than K and signal quality of a current serving cell of the terminal device is lower than L, the cell meets the handover trigger condition. The current serving cell of the terminal device is a cell that serves the terminal device when the terminal device receives the conditional handover configuration information. That is, the current serving cell of the terminal device is the source cell. It can be seen that K and L are both thresholds, and the unit measuring Q and L may be decibel (dB) or decibel milliwatt (dBm). This is not specifically limited in this embodiment of this application.

Optionally, the handover trigger condition in this embodiment of this application may correspond to each of the M candidate cells one to one. In other words, the network device may configure M handover trigger conditions, and the M handover trigger conditions correspond to the M candidate cells one to one. Alternatively, the network device may configure the same handover trigger condition for a plurality of candidate cells. This is not specifically limited in this application. In an example, the source cell is the cell A and the three candidate cells B, C, and D are configured in the conditional handover configuration information. A handover trigger condition 1 may be configured for the cell B, a handover trigger condition 2 may be configured for the cell C, and a handover trigger condition 3 may be configured for the cell D; or, a handover trigger condition 4 may be configured for the cells B and C, and a handover trigger condition 5 may be configured for the cell D; or, a same handover trigger condition 6 may be configured for the cells B, C, and D.

It needs to be noted that the configuration of the handover trigger condition and a correspondence between the handover trigger condition and the candidate cell are merely illustrative description of this application, and are not specifically limited in this application in practical applications.

In this embodiment of this application, when the terminal device determines whether a cell in the candidate cells meets the handover trigger condition, the determining may be performed by "polling", or may be "one-off". The "polling" determining means that the terminal device repeatedly determines whether a candidate cell that has undergone a determining procedure meets the handover trigger condition. The "one-off" determining means that the terminal device does not repeatedly determine whether a candidate cell that has undergone a determining procedure meets the handover trigger condition. In the "polling" determining, total duration in which the terminal device determines whether the candidate cell meets the handover trigger condition may be specified in a protocol, or may be sent by the network device to the terminal device (for example, the message 1 sent by the first network device to the terminal device may contain information about the total duration, and this is not specifically limited in this application). Certainly, optionally, the "polling" determining may be performed without a time limit. For example, the candidate cells B and C are configured in the conditional handover configuration information. If the terminal device determines that the cell B does not meet the handover trigger condition, and subsequently the terminal device may continue to determine whether the cell B meets the handover trigger condition, the determining is "polling". If, once the terminal device determines that the cell B does not meet the handover trigger condition, the terminal device stops determining whether the cell B meets the handover trigger condition, the determining is "one-off".

In addition, when the terminal device determines, based on the conditional handover configuration information, whether a cell in the candidate cells meets the handover trigger condition, if the terminal device fails in accessing a cell that meets the handover trigger condition among the configured candidate cells, or, if the terminal device determines that a cell among the candidate cells does not meet the handover trigger condition, the terminal device may continue to determine whether any cell in the candidate cells meets the handover trigger condition (in this case, the terminal device may perform the determining by "polling" or in a "one-off" manner, and this is not specifically limited in this application), until the terminal device determines a cell that meets the handover trigger condition and successfully accesses the cell that meets the handover trigger condition, and in this case, the foregoing whole procedure may be regarded as a CHO procedure; or, until all the candidate cells have undergone the determining by the terminal device as to whether any candidate cell meets the handover trigger condition, that is, until all the candidate cells have undergone at least one attempt of determining by the terminal device as to whether any of the cells meets the handover trigger condition (in this case, the terminal device may perform the determining by "polling" or in a "one-off" manner, and this is not specifically limited in this application), and in this case, the foregoing whole procedure may be regarded as a CHO procedure. In this CHO procedure, it is possible that none of the candidate cells meets the handover trigger condition or the terminal device fails in accessing all cells that meet the handover trigger condition among the candidate cells. In an example, the candidate cell B, the candidate cell C, and the candidate cell D are configured in the conditional handover configuration information, and the terminal device performs determining in a "one-off" manner. If the terminal device firstly determines that the cell B does not meet the handover trigger condition or the terminal device fails in accessing the cell B although the cell B meets the handover trigger condition, the terminal device may continue to determine whether remaining candidate cells (such as the cell C or the cell D) meet the handover trigger condition. If the terminal device determines that the cell D meets the handover trigger condition and the terminal device successfully accesses the cell D, the terminal device stops determining whether the cell C meets the handover trigger condition. Alternatively, in an example, the candidate cell B, the candidate cell C, and the candidate cell D are configured in the conditional handover configuration information. If the terminal device firstly determines that the cell B does not meet the handover trigger condition or the terminal device fails in accessing the cell B although the cell B meets the handover trigger condition, the terminal device may continue to determine whether remaining candidate cells (such as the cell C or the cell D) meet the handover trigger condition. If the terminal device determines that the terminal device fails in accessing the cell D although the cell D meets the handover trigger condition or that the cell D does not meet the handover trigger condition, the terminal device continues to determine whether the cell C meets the handover trigger condition.

Alternatively, in a possible implementation, when the terminal device determines, based on the conditional handover configuration information, whether a cell in the candidate cells meets the handover trigger condition, the determining is performed for a maximum of N times, where N may be specified in a protocol or may be sent by the network device to the terminal device (for example, the message 1 sent by the first network device to the terminal device may contain a value of N, and N is an integer greater than or equal to 1). In this implementation, if the terminal device fails in accessing a cell that meets the handover trigger condition among the configured candidate cells, or, if the terminal device determines that a cell among the candidate cells does not meet the handover trigger condition, the terminal device may continue to perform subsequent determining, that is, determine whether any cell in the candidate cells meets the handover trigger condition (in this case, the terminal device may perform the determining by "polling" or in a "one-off" manner, and this is not specifically limited in this application). The terminal device does not stop the determining until: (1) a total quantity of times of determining by the terminal device reaches N; or (2) before a quantity of times of determining reaches N, the terminal device determines a cell meeting the handover trigger condition and successfully accesses the cell meeting the handover trigger condition. When the determining is performed for N times, the terminal device stops the determining. The foregoing whole procedure may be regarded as a CHO procedure. Alternatively, the total quantity of times of determining by the terminal device does not reach N, and, before the quantity of times of determining reaches N, the terminal device determines a cell meeting the handover trigger condition and successfully accesses the cell meeting the handover trigger condition. Therefore, the terminal device stops the determining. The foregoing whole procedure may be regarded as a CHO procedure. In an example, the candidate cell B, the candidate cell C, and the candidate cell D are configured in the conditional handover configuration information, N is 2, and the terminal device performs determining in a "one-off" manner. If the terminal device firstly determines that the cell B does not meet the handover trigger condition or the terminal device fails in accessing the cell B although the cell B meets the handover trigger condition, the terminal device may continue to determine whether remaining candidate cells (such as the cell C or the cell D) meet the handover trigger condition. If the terminal device determines that the cell C meets the handover trigger condition but the terminal device fails in accessing the cell C, or, if the cell C does not meet the handover trigger condition, the terminal device stops determining whether the cell D meets the handover trigger condition. Alternatively, if the terminal device firstly determines that the cell B meets the handover trigger condition and the terminal device successfully accesses the cell B, even if N is equal to 1 without reaching 2, the terminal device stops determining whether the cell C or the cell D meets the handover trigger condition.

Alternatively, in another possible implementation, when the terminal device determines, based on the conditional handover configuration information, whether a cell in the candidate cells meets the handover trigger condition, a maximum of R random access attempts are made. The random access attempts mean: when the terminal device determines, based on the conditional handover configuration information, that a candidate cell meets the handover trigger condition, the terminal device performs random access to the cell for attempting to access the cell. For example, the terminal device has a maximum of R chances of random access attempts. The terminal device keeps the determining until all the candidate cells have undergone the determining by the terminal device and none of the candidate cells meets the handover trigger condition, or, until the terminal device initiated all the R random access attempts, or, until the terminal device successfully accesses a cell meeting the handover trigger condition although the terminal device has not completed all the R random access attempts. R may be specified in a protocol, or may be sent by the network device to the terminal device. For example, the message 1 sent by the first network device to the terminal device may contain a value of R, where R is an integer greater than or equal to 1. This is not specifically limited in this embodiment of this application. In this implementation, if the terminal device fails in accessing a cell that meets the handover trigger condition among the configured candidate cells, or, if the terminal device determines that a cell among the candidate cells does not meet the handover trigger condition, the terminal device may continue to perform subsequent determining, that is, determine whether any cell in the candidate cells meets the handover trigger condition (in this case, the terminal device may perform the determining by "polling" or in a "one-off" manner, and this is not specifically limited in this application). The terminal device does not stop the determining or terminate this CHO procedure until: (1) a total quantity of random access attempts initiated by the terminal device reaches R; or (2) before a total quantity of random access attempts reaches R, the terminal device determines a cell meeting the handover trigger condition and successfully accesses the cell meeting the handover trigger condition; or (3) none of the configured candidate cells meets the handover trigger condition. When all the R random access attempts are completed, the terminal device stops the determining. The foregoing whole procedure may be regarded as a CHO procedure. Alternatively, the total quantity of random access attempts initiated by the terminal device does not reach R, and, before the quantity of random access attempts reaches R, the terminal device determines a cell meeting the handover trigger condition and successfully accesses the cell meeting the handover trigger condition. Therefore, the terminal device stops the determining. The foregoing whole procedure may be regarded as a CHO procedure. Alternatively, the terminal device determines that none of the candidate cells configured by the network device meets the handover trigger condition, and the total quantity of random access attempts initiated by the terminal device is equal to 0, and therefore, the terminal device stops the determining although the total quantity of random access attempts does not reach R. The foregoing whole procedure may be regarded as a CHO procedure. In an example, the candidate cell B, the candidate cell C, and the candidate cell D are configured in the conditional handover configuration information, R is 2, and the terminal device performs determining in a "one-off" manner. If the terminal device firstly determines that the cell B meets the handover trigger condition but the terminal device fails in accessing the cell B, the terminal device may continue to determine whether remaining candidate cells (such as the cell C or the cell D) meet the handover trigger condition. If the terminal device determines that the cell C meets the handover trigger condition but the terminal device fails in accessing the cell C, the terminal device stops determining. In this case, R=2, and this CHO procedure ends. Alternatively, if the terminal device firstly determines that the cell B meets the handover trigger condition and the terminal device successfully accesses the cell B, even if R is equal to 1 without reaching 2, the terminal device stops determining, and this CHO procedure ends. Alternatively, if the terminal device determines that none of the candidate cell B, the candidate cell C, and the candidate cell D meets the handover trigger condition, the terminal device stops the determining. In this case, R=0, and this CHO procedure ends.

Alternatively, in another possible implementation, when the terminal device determines, based on the conditional handover configuration information, whether a cell in the candidate cells meets the handover trigger condition, the determining is performed within merely duration of H after receipt of the conditional handover configuration information, where H may be specified in a protocol or may be sent by the network device to the terminal device (for example, the message 1 sent by the first network device to the terminal device may contain a value of H). In this implementation, if the terminal device fails in accessing a cell that meets the handover trigger condition among the configured candidate cells, or, if the terminal device determines that a cell among the candidate cells does not meet the handover trigger condition, the terminal device may continue to perform subsequent determining within the duration of H after receipt of the conditional handover configuration information, so as to determine whether any cell in the candidate cells meets the handover trigger condition (in this case, the terminal device may perform the determining by "polling" or in a "one-off" manner, and this is not specifically limited in this application). The terminal device does not stop the determining until: timeout; or, before the timeout, the terminal device determines a cell meeting the handover trigger condition and successfully accesses the cell meeting the handover trigger condition. The foregoing whole procedure may be regarded as a CHO procedure. In an example, the candidate cell B, the candidate cell C, and the candidate cell D are configured in the conditional handover configuration information, H is 100 seconds, and the terminal device performs determining in a "one-off" manner. If the terminal device firstly determines that the cell B does not meet the handover trigger condition or the terminal device fails in accessing the cell B although the cell B meets the handover trigger condition, the terminal device may continue to determine, within a remaining time, whether remaining candidate cells (such as the cell C or the cell D) meet the handover trigger condition. If timeout occurs, or, before the timeout, the terminal device determines a cell meeting the handover trigger condition and successfully accesses the cell meeting the handover trigger condition, the terminal device stops the determining.

Optionally, in all the foregoing possible implementations in which the terminal device determines whether the candidate cells meet the handover trigger condition, order of determining by the terminal device may be regular. For example, the network device may specify order of determining with respect to the candidate cells. Alternatively, the network device may specify a priority of each candidate cell and the terminal device performs the determining with respect to the candidate cells according to the priority. Alternatively, a protocol stipulates the order in which the terminal device performs the determining with respect to the candidate cells. Alternatively, the order of determining by the terminal device may be irregular. For example, the order of determining depends on an implementation of the terminal device. This is not specifically limited in this embodiment of this application.

The following describes the MRO information recorded by the terminal device in step S602 by way of example. Specifically, the MRO-related information recorded by the terminal device in different scenarios is described in detail below by using an example. In the example: the source cell is the cell A, and two candidate cells, that is, the cell B and the cell C, are configured in the conditional handover configuration information; if the terminal device fails in accessing a cell that meets the handover trigger condition among the configured candidate cells, or, if the terminal device determines that a cell among the candidate cells does not meet the handover trigger condition, the terminal device continues to determine whether any cell in the candidate cells meets the handover trigger condition, until the terminal device determines a cell meeting the handover trigger condition and successfully accesses the cell meeting the handover trigger condition; or, until all the candidate cells have undergone the determining by the terminal device as to whether any of the candidate cells meets the handover trigger condition.

It needs to be noted that two prerequisites may exist in the conditional handover procedure: prerequisite 1: after receiving the conditional handover configuration information, the terminal device may keep data transmission with the source cell until the terminal device successfully accesses a target cell or until an RLF occurs in the source cell; or prerequisite 2: the terminal device disconnects data transmission with the source cell immediately after receiving the conditional handover configuration information. In the following different scenarios, a connection status of the terminal device under the two prerequisites in a CHO procedure is described.

Scenario I: The cell B is a candidate target cell, and the cell C is a to-be-determined cell. The terminal device fails in accessing the cell B.

Optionally, in this scenario, the terminal device may determine, based on the conditional handover configuration information, that the cell B meets the handover trigger condition. Therefore, a random access procedure is performed by the terminal device with the cell B, but the random access procedure by the terminal device with the cell B fails; or, an RLF occurs in the cell B after the terminal device successfully accesses the cell B. In addition, the terminal device determines, based on the conditional handover configuration information, that the cell C does not meet the handover trigger condition.

In Scenario I, in this CHO procedure performed by the terminal device based on the currently received conditional handover configuration information, because the terminal device fails in accessing the cell B and the cell C does not meet the handover trigger condition, a cell that ultimately serves the terminal device in this CHO procedure (or, as understood in a different way, a cell that ultimately holds (or establishes or maintains) an RRC connection to the terminal device in this CHO procedure) may fall in any of the following four circumstances:

(1) Under the prerequisite 1, if the terminal device fails in accessing the cell B and determines that the cell C does not meet the handover trigger condition, and an RLF occurs between the terminal device and the source cell A (for example, signal quality of the source cell A deteriorates), the terminal device initiates a re-establishment procedure to re-establish an RRC connection to an appropriate new cell D selected (such as a cell meeting an S criterion).

(2) Under the prerequisite 2, if the terminal device fails in accessing the cell B and determines that the cell C does not meet the handover trigger condition, the terminal device initiates a re-establishment procedure to re-establish an RRC connection to an appropriate new cell D selected (such as a cell meeting the S criterion).

(3) Under the prerequisite 1, if the terminal device fails in accessing the cell B and determines that the cell C does not meet the handover trigger condition, and the source cell A is of relatively high signal quality, no RLF occurs between the terminal device and the source cell A, that is, an RRC connection is still kept between the terminal device and the source cell A (or the source network device).

(4) Under the prerequisite 2, if the terminal device fails in accessing the cell B and determines that the cell C does not meet the handover trigger condition, the terminal device initiates a re-establishment procedure, in which an appropriate cell selected is the source cell A. Therefore, the terminal device performs an RRC re-establishment procedure with the source cell A.

It needs to be noted that in this embodiment of this application, the appropriate new cell D selected by the terminal device may be the same as the source cell A, or may be different from the source cell A. This is not specifically limited in this application. In addition, the appropriate new cell D selected by the terminal device may be the same as the candidate cell (such as the cell B or the cell C), or may be different from the candidate cell. This is not specifically limited in this application.

In the circumstance (1) of Scenario I, the MRO-related information recorded by the terminal device includes a first failure cause value corresponding to the cell B and a second failure cause value corresponding to the cell C. For the description of the first failure cause value, reference may be made to the description of the first failure cause value in the foregoing embodiment; for the description of the second failure cause value, reference may be made to the description of the second failure cause value in the foregoing embodiment, and details are not repeated herein.

Optionally, in the circumstance (1) of Scenario I, the MRO-related information recorded by the terminal device may further include one or more of the following items in the first information: the information about the source cell, the information about the candidate target cell, the first time information corresponding to each of the at least one candidate target cell, the information about the to-be-determined cell, the second time information corresponding to each of the at least one to-be-determined cell, the information about the cell that ultimately serves the terminal device in this CHO procedure (or, as understood in a different way, the cell that ultimately holds (or establishes or maintains) an RRC connection to the terminal device in this CHO procedure), and the UL carrier information of the candidate target cell. Specifically, in the circumstance (1) of Scenario I, the source cell is the cell A; the candidate target cell is the cell B; the to-be-determined cell is the cell C; and the cell that ultimately serves the terminal device (or, as understood in a different way, the cell that ultimately holds (or establishes) an RRC connection to the terminal device in this CHO procedure) is the cell D. For the detailed description of the relevant information, reference may be made to the description of the corresponding information in the foregoing embodiment, and details are not repeated herein.

In the circumstance (2) of Scenario I, the cell that ultimately serves the terminal device (or, as understood in a different way, the cell that ultimately holds (or establishes) an RRC connection to the terminal device in this CHO procedure) is the cell D. The MRO-related information recorded by the terminal device is the same as the MRO-related information recorded in the circumstance (1) of Scenario I. For the relevant description, reference may be made to the description of the circumstance (1) of Scenario I, and details are not repeated herein.

In the circumstance (3) of Scenario I, the cell that ultimately serves the terminal device (or, as understood in a different way, the cell that ultimately holds (or maintains) an RRC connection to the terminal device in this CHO procedure) is the cell A. The MRO information recorded by the terminal device is similar to the MRO-related information recorded in the circumstance (1) of Scenario I, but the difference is that in the circumstance (3) of Scenario I, the recorded information about the cell that ultimately serves the terminal device in this CHO procedure is the information about the source cell A rather than the information about the cell D. For the relevant description, reference may be made to the description of the circumstance (1) of Scenario I, and details are not repeated herein.

In the circumstance (4) of Scenario I, the cell that ultimately serves the terminal device (or, as understood in a different way, the cell that ultimately holds (or establishes) an RRC connection to the terminal device in this CHO procedure) is the cell A. The MRO information recorded by the terminal device is the same as the MRO-related information recorded in the circumstance (3) of Scenario I. For the relevant description, reference may be made to the description of the circumstance (3) of Scenario I, and details are not repeated herein.

Scenario II: The cell B is a candidate target cell. The terminal device fails in accessing the cell B, but successfully accesses the cell C.

Optionally, in this scenario, the terminal device determines, based on the conditional handover configuration information, that the cell B meets the handover trigger condition. Therefore, a random access procedure is performed by the terminal device with the cell B, but the random access procedure by the terminal device with the cell B fails; or, an RLF occurs in the cell B after the terminal device successfully accesses the cell B. In addition, the terminal device determines, based on the conditional handover configuration information, that the cell C meets the handover trigger condition. Therefore, a random access procedure is performed by the terminal device with the cell C, and the random access procedure by the terminal device with the cell C succeeds so that the terminal device hands over to the cell C successfully.

In Scenario II, the MRO-related information recorded by the terminal device includes a first failure cause value corresponding to the cell B. For the description of the first failure cause value, reference may be made to the description of the first failure cause value in the foregoing embodiment, and details are not repeated herein.

Optionally, in Scenario II, the MRO-related information recorded by the terminal device may further include one or more of the following items in the first information: the information about the source cell, the information about the candidate target cell, the first time information corresponding to each of the at least one candidate target cell, the information about the cell that ultimately serves the terminal device in this CHO procedure (or, as understood in a different way, the cell that ultimately holds (or establishes or maintains) an RRC connection to the terminal device in this CHO procedure), and the UL carrier information of the candidate target cell. Specifically, in Scenario II, the source cell is the cell A, the at least one candidate target cell includes the cell B, and the cell that ultimately serves the terminal device in this CHO procedure (or, as understood in a different way, the cell that ultimately holds (or establishes) an RRC connection to the terminal device in this CHO procedure) is the cell C. For detailed description of the relevant information, reference may be made to the description of the corresponding information in the foregoing embodiment, and details are not repeated herein.

Scenario III: The cell B and the cell C are candidate target cells. The terminal device fails in accessing the cell B and the cell C.

Optionally, in this scenario, the terminal device determines, based on the conditional handover configuration information, that the cell B meets the handover trigger condition. Therefore, a random access procedure is performed by the terminal device with the cell B, but the random access procedure by the terminal device with the cell B fails; or, an RLF occurs in the cell B after the terminal device successfully accesses the cell B. In addition, the terminal device determines, based on the conditional handover configuration information, that the cell C meets the handover trigger condition. Therefore, a random access procedure is performed by the terminal device with the cell C, but the random access procedure by the terminal device with the cell C fails; or, an RLF occurs in the cell C after the terminal device successfully accesses the cell C.

In Scenario III, in this CHO procedure performed by the terminal device based on the currently received conditional handover configuration information, because the terminal device fails in accessing the cell B and the cell C, the cell that ultimately serves the terminal device in this CHO procedure (or, as understood in a different way, the cell that ultimately holds (or establishes or maintains) an RRC connection to the terminal device in this CHO procedure and that is determined by the terminal device), may fall in any of the following four circumstances:

(1) Under the prerequisite 1, if the terminal device fails in accessing the cell B and fails in accessing the cell C, and an RLF occurs between the terminal device and the source cell A (for example, signal quality of the source cell A deteriorates), the terminal device initiates a re-establishment procedure to re-establish an RRC connection to an appropriate new cell D selected (such as a cell meeting an S criterion).

(2) Under the prerequisite 2, if the terminal device fails in accessing the cell B and fails in accessing the cell C, the terminal device initiates a re-establishment procedure to re-establish an RRC connection to an appropriate new cell D selected (such as a cell meeting the S criterion).

(3) Under the prerequisite 1, if the terminal device fails in accessing the cell B and fails in accessing the cell C, and the source cell A is of relatively high signal quality, no RLF occurs between the terminal device and the source cell A, that is, an RRC connection is still kept between the terminal device and the source cell A (or the source network device).

(4) Under the prerequisite 2, if the terminal device fails in accessing the cell B and fails in accessing the cell C, the terminal device initiates a re-establishment procedure, in which an appropriate cell selected is the source cell A. Therefore, the terminal device performs an RRC re-establishment procedure with the source cell A.

In the circumstance (1) of Scenario III, the MRO-related information recorded by the terminal device includes a first failure cause value corresponding to the cell B and a first failure cause value corresponding to the cell C. For the relevant description of the first failure cause value, reference may be made to the description of the first failure cause value in the foregoing embodiment, and details are not repeated herein.

Optionally, in the circumstance (1) of Scenario III, the MRO-related information recorded by the terminal device may further include one or more of the following items in the first information: the information about the source cell, the information about the candidate target cell, the first time information corresponding to each of the at least one candidate target cell, the information about the cell that ultimately serves the terminal device in this CHO procedure (or, as understood in a different way, the cell that ultimately holds (or establishes or maintains) an RRC connection to the terminal device in this CHO procedure), and the UL carrier information of the candidate target cell. Specifically, in the circumstance (1) of Scenario III, the source cell is the cell A; the candidate target cells include the cell B and the cell C; and the cell that ultimately serves the terminal device in this CHO procedure (or, as understood in a different way, the cell that ultimately holds (or establishes) an RRC connection to the terminal device in this CHO procedure) is the cell D. For the detailed description of the relevant information, reference may be made to the description of the corresponding information in the foregoing embodiment, and details are not repeated herein.

In the circumstance (2) of Scenario III, the cell that ultimately serves the terminal device (or, as understood in a different way, the cell that ultimately holds (or establishes) an RRC connection to the terminal device in this CHO procedure) is the cell D. The MRO-related information recorded by the terminal device is the same as the MRO-related information recorded in the circumstance (1) of Scenario III. For the relevant description, reference may be made to the description of the circumstance (1) of Scenario III, and details are not repeated herein.

In the circumstance (3) of Scenario III, the cell that ultimately serves the terminal device (or, as understood in a different way, the cell that ultimately holds (or maintains) an RRC connection to the terminal device in this CHO procedure) is the cell A. The MRO information recorded by the terminal device is similar to the MRO-related information recorded in the circumstance (1) of Scenario III, but the difference is that in the circumstance (3) of Scenario III, the recorded information about the cell that ultimately serves the terminal device in this CHO procedure is the information about the source cell A rather than the information about the cell D. For the relevant description, reference may be made to the description of the circumstance (1) of Scenario III, and details are not repeated herein.

In the circumstance (4) of Scenario III, the cell that ultimately serves the terminal device (or, as understood in a different way, the cell that ultimately holds (or establishes) an RRC connection to the terminal device in this CHO procedure) is the cell A. The MRO information recorded by the terminal device is the same as the MRO-related information recorded in the circumstance (3) of Scenario III. For the relevant description, reference may be made to the description of the circumstance (3) of Scenario III, and details are not repeated herein.

Scenario IV: The cell B and the cell C are to-be-determined cells. That is, neither the cell B nor the cell C meets the handover trigger condition.

Specifically, the terminal device determines, based on the conditional handover configuration information, that the cell B does not meet the handover trigger condition, and continues to determine whether the cell C meets the handover trigger condition. The terminal device determines that the cell C does not meet the handover trigger condition either.

In Scenario IV, in this CHO procedure performed by the terminal device based on the currently received conditional handover configuration information, because neither the cell B nor the cell C meets the handover trigger condition, the cell that ultimately serves the terminal device in this CHO procedure (or, as understood in a different way, the cell that ultimately holds (or establishes or maintains) an RRC connection to the terminal device in this CHO procedure) may fall in any of the following four circumstances:

(1) Under the prerequisite 1, if the terminal device determines that the cell B does not meet the handover trigger condition and the cell C does not meet the handover trigger condition, and an RLF occurs between the terminal device and the source cell A (for example, signal quality of the source cell A deteriorates), the terminal device initiates a re-establishment procedure to re-establish an RRC connection to an appropriate new cell D selected (such as a cell meeting an S criterion).

(2) Under the prerequisite 2, if the terminal device determines that the cell B does not meet the handover trigger condition and the cell C does not meet the handover trigger condition, the terminal device initiates a re-establishment procedure to re-establish an RRC connection to an appropriate new cell D selected (such as a cell meeting the S criterion).

(3) Under the prerequisite 1, if the terminal device determines that the cell B does not meet the handover trigger condition and the cell C does not meet the handover trigger condition, and the source cell A is of relatively high signal quality, no RLF occurs between the terminal device and the source cell A, that is, an RRC connection is still kept between the terminal device and the source cell A (or the source network device).

(4) Under the prerequisite 2, if the terminal device determines that the cell B does not meet the handover trigger condition and the cell C does not meet the handover trigger condition, the terminal device initiates a re-establishment procedure, in which an appropriate cell selected is the source cell A. Therefore, the terminal device performs an RRC re-establishment procedure with the source cell A.

In the circumstance (1) of Scenario IV, the MRO-related information recorded by the terminal device includes a second failure cause value corresponding to the cell B and a second failure cause value corresponding to the cell C. For the relevant description of the second failure cause value, reference may be made to the description of the second failure cause value in the foregoing embodiment, and details are not repeated herein.

Optionally, in the circumstance (1) of Scenario IV, the MRO-related information recorded by the terminal device may further include one or more of the following items in the first information: the information about the source cell, the information about the to-be-determined cell, the second time information corresponding to each of the at least one to-be-determined cell, and the information about the cell that ultimately serves the terminal device in this CHO procedure (or, as understood in a different way, the cell that ultimately holds (or maintains) an RRC connection to the terminal device in this CHO procedure). Specifically, in the circumstance (1) of Scenario IV, the source cell is the cell A, the to-be-determined cells include the cell B and the cell C, and the cell that ultimately serves the terminal device in this CHO procedure (or, as understood in a different way, the cell that ultimately holds (or establishes) an RRC connection to the terminal device in this CHO procedure) is the cell D. For description of the relevant information, reference may be made to the description of the corresponding information in the foregoing embodiment, and details are not repeated herein.

In the circumstance (2) of Scenario IV, the cell that ultimately serves the terminal device (or, as understood in a different way, the cell that ultimately holds (or establishes) an RRC connection to the terminal device in this CHO procedure) is the cell D. The MRO-related information recorded by the terminal device is the same as the MRO-related information recorded in the circumstance (1) of Scenario IV. For the relevant description, reference may be made to the description of the circumstance (1) of Scenario IV, and details are not repeated herein.

In the circumstance (3) of Scenario IV, the cell that ultimately serves the terminal device (or, as understood in a different way, the cell that ultimately holds (or maintains) an RRC connection to the terminal device in this CHO procedure) is the cell A. The MRO information recorded by the terminal device is similar to the MRO-related information recorded in the circumstance (1) of Scenario IV, but the difference is that in the circumstance (3) of Scenario IV, the recorded information about the cell that ultimately serves the terminal device in this CHO procedure is the information about the source cell A rather than the information about the cell D. For the relevant description, reference may be made to the description of the circumstance (1) of Scenario IV, and details are not repeated herein.

In the circumstance (4) of Scenario IV, the cell that ultimately serves the terminal device (or, as understood in a different way, the cell that ultimately holds (or establishes) an RRC connection to the terminal device in this CHO procedure) is the cell A. The MRO information recorded by the terminal device is the same as the MRO-related information recorded in the circumstance (3) of Scenario IV. For the relevant description, reference may be made to the description of the circumstance (3) of Scenario IV, and details are not repeated herein.

In the foregoing four scenarios, if the terminal device fails in accessing a cell that meets the handover trigger condition among the configured candidate cells, or, if the terminal device determines that a cell among the candidate cells does not meet the handover trigger condition, the terminal device continues to determine whether any cell in the candidate cells meets the handover trigger condition, until the terminal device determines a cell meeting the handover trigger condition and successfully accesses the cell meeting the handover trigger condition; or, until all the candidate cells have undergone the determining by the terminal device as to whether any of the candidate cells meets the handover trigger condition. The following uses an example to describe in detail the MRO-related information recorded by terminal device in different scenarios. In the example, when the terminal device determines, based on the conditional handover configuration information, whether any cell in the candidate cells meets the handover trigger condition, the determining is performed for a maximum of N times. Specifically, N is 1, the source cell is the cell A, and two candidate cells, that is, the candidate cell B and the candidate cell C, are configured in the conditional handover configuration information.

It needs to be noted that when the terminal device performs the determining for a maximum of N times, a candidate cell may be selected by the terminal device randomly or according to a preset rule for determining. The preset rule may be specified in a protocol or configured by the network device. This is not specifically limited in this application.

Scenario V: The cell B is a candidate target cell. The terminal device fails in accessing the cell B.

Specifically, the terminal device determines, based on the conditional handover configuration information, that the cell B meets the handover trigger condition. Therefore, a random access procedure is performed by the terminal device with the cell B, but the random access procedure by the terminal device with the cell B fails; or, an RLF occurs in the cell B after the terminal device successfully accesses the cell B. In this case, because N is equal to 1, that is, the terminal device performs the determining for a maximum of one time, the terminal device stops determining whether the cell C meets the handover trigger condition.

In Scenario V, in this CHO procedure performed by the terminal device based on the currently received conditional handover configuration information, because the terminal device fails in accessing the cell B after performing the determining for one time, the cell that ultimately serves the terminal device in this CHO procedure (or, as understood in a different way, the cell that ultimately holds (or establishes or maintains) an RRC connection to the terminal device in this CHO procedure) may fall in any of the following four circumstances:

(1) Under the prerequisite 1, if the terminal device fails in accessing the cell B, and an RLF occurs between the terminal device and the source cell A (for example, signal quality of the source cell A deteriorates), the terminal device initiates a re-establishment procedure to re-establish an RRC connection to an appropriate new cell D selected (such as a cell meeting an S criterion).

(2) Under the prerequisite 2, if the terminal device fails in accessing the cell B, the terminal device initiates a re-establishment procedure to re-establish an RRC connection to an appropriate new cell D selected (such as a cell meeting the S criterion).

(3) Under the prerequisite 1, if the terminal device fails in accessing the cell B, and the source cell A is of relatively high signal quality, no RLF occurs between the terminal device and the source cell A, that is, an RRC connection is still kept between the terminal device and the source cell A (or the source network device).

(4) Under the prerequisite 2, if the terminal device fails in accessing the cell B, the terminal device initiates a re-establishment procedure, in which an appropriate cell selected is the source cell A. Therefore, the terminal device performs an RRC re-establishment procedure with the source cell A.

In the circumstance (1) of Scenario V, the MRO-related information recorded by the terminal device includes a first failure cause value corresponding to the cell B. For the relevant description of the first failure cause value, reference may be made to the description of the first failure cause value in the foregoing embodiment, and details are not repeated herein.

Optionally, in the circumstance (1) of Scenario V, the MRO-related information recorded by the terminal device may further include one or more of the following items in the first information: the information about the source cell, the information about the candidate target cell, the first time information corresponding to each of the at least one candidate target cell, the information about the cell that ultimately serves the terminal device in this CHO procedure (or, as understood in a different way, the cell that ultimately holds (or establishes or maintains) an RRC connection to the terminal device in this CHO procedure), and the UL carrier information of the candidate target cell. Specifically, in the circumstance (1) of Scenario V, the source cell is the cell A; the at least one candidate target cell includes the cell B; and the cell that ultimately serves the terminal device in this CHO procedure (or, as understood in a different way, the cell that ultimately holds (or establishes) an RRC connection to the terminal device in this CHO procedure) is the cell D. For the description of the relevant information, reference may be made to the description of the corresponding information in the foregoing embodiment, and details are not repeated herein.

In the circumstance (2) of Scenario V, the cell that ultimately serves the terminal device (or, as understood in a different way, the cell that ultimately holds (or establishes) an RRC connection to the terminal device in this CHO procedure) is the cell D. The MRO-related information recorded by the terminal device is the same as the MRO-related information recorded in the circumstance (1) of Scenario V. For the relevant description, reference may be made to the description of the circumstance (1) of Scenario V, and details are not repeated herein.

In the circumstance (3) of Scenario V, the cell that ultimately serves the terminal device (or, as understood in a different way, the cell that ultimately holds (or maintains) an RRC connection to the terminal device in this CHO procedure) is the cell A. The MRO information recorded by the terminal device is similar to the MRO-related information recorded in the circumstance (1) of Scenario V, but the difference is that in the circumstance (3) of Scenario V, the recorded information about the cell that ultimately serves the terminal device in this CHO procedure is the information about the source cell A rather than the information about the cell D. For the relevant description, reference may be made to the description of the circumstance (1) of Scenario V, and details are not repeated herein.

In the circumstance (4) of Scenario V, the cell that ultimately serves the terminal device (or, as understood in a different way, the cell that ultimately holds (or establishes) an RRC connection to the terminal device in this CHO procedure) is the cell A. The MRO information recorded by the terminal device is the same as the MRO-related information recorded in the circumstance (3) of Scenario V. For the relevant description, reference may be made to the description of the circumstance (3) of Scenario V, and details are not repeated herein.

Scenario VI: The cell B is a to-be-determined cell. That is, the cell B does not meet the handover trigger condition.

Specifically, the terminal device determines, based on the conditional handover configuration information, that the cell B does not meet the handover trigger condition. In this case, because N is equal to 1, that is, the terminal device performs the determining for a maximum of one time, the terminal device stops determining whether the cell C meets the handover trigger condition.

In Scenario VI, in this CHO procedure performed by the terminal device based on the currently received conditional handover configuration information, because the terminal device determines, after performing the determining for one time, that the cell B does not meet the handover trigger condition, the cell that ultimately serves the terminal device in this CHO procedure (or, as understood in a different way, the cell that ultimately holds (or establishes or maintains) an RRC connection to the terminal device in this CHO procedure) may fall in any of the following four circumstances:

(1) Under the prerequisite 1, if the cell B does not meet the handover trigger condition, and an RLF occurs between the terminal device and the source cell A (for example, signal quality of the source cell A deteriorates), then the terminal device initiates a re-establishment procedure to re-establish an RRC connection to an appropriate new cell D selected (such as a cell meeting an S criterion).

(2) Under the prerequisite 2, if the cell B does not meet the handover trigger condition, the terminal device initiates a re-establishment procedure to re-establish an RRC connection to an appropriate new cell D selected (such as a cell meeting the S criterion).

(3) Under the prerequisite 1, if the cell B does not meet the handover trigger condition, and the source cell A is of relatively high signal quality, no RLF occurs between the terminal device and the source cell A, that is, an RRC connection is still kept between the terminal device and the source cell A (or the source network device).

(4) Under the prerequisite 2, if the cell B does not meet the handover trigger condition, the terminal device initiates a re-establishment procedure, in which an appropriate cell selected is the source cell A. Therefore, the terminal device performs an RRC re-establishment procedure with the source cell A.

In the circumstance (1) of Scenario VI, the MRO-related information recorded by the terminal device includes a second failure cause value corresponding to the cell B. For the relevant description of the second failure cause value, reference may be made to the description of the second failure cause value in the foregoing embodiment, and details are not repeated herein.

Optionally, in the circumstance (1) of Scenario VI, the MRO-related information recorded by the terminal device may further include one or more of the following items in the first information: the information about the source cell, the information about the to-be-determined cell, the second time information corresponding to each of the at least one to-be-determined cell, and the information about the cell that ultimately serves the terminal device in this CHO procedure (or, as understood in a different way, the cell that ultimately holds (or establishes or maintains) an RRC connection to the terminal device in this CHO procedure). Specifically, in the circumstance (1) of Scenario VI, the source cell is the cell A, the to-be-determined cell is the cell B, and the cell that ultimately serves the terminal device in this CHO procedure (or, as understood in a different way, the cell that ultimately holds (or establishes) an RRC connection to the terminal device in this CHO procedure) is the cell D. For description of the relevant information, reference may be made to the description of the corresponding information in the foregoing embodiment, and details are not repeated herein.

In the circumstance (2) of Scenario VI, the cell that ultimately serves the terminal device (or, as understood in a different way, the cell that ultimately holds (or establishes) an RRC connection to the terminal device in this CHO procedure) is the cell D. The MRO-related information recorded by the terminal device is the same as the MRO-related information recorded in the circumstance (1) of Scenario VI. For the relevant description, reference may be made to the description of the circumstance (1) of Scenario VI, and details are not repeated herein.

In the circumstance (3) of Scenario VI, the cell that ultimately serves the terminal device (or, as understood in a different way, the cell that ultimately holds (or maintains) an RRC connection to the terminal device in this CHO procedure) is the cell A. The MRO information recorded by the terminal device is similar to the MRO-related information recorded in the circumstance (1) of Scenario VI, but the difference is that in the circumstance (3) of Scenario VI, the recorded information about the cell that ultimately serves the terminal device in this CHO procedure is the information about the source cell A rather than the information about the cell D. For the relevant description, reference may be made to the description of the circumstance (1) of Scenario VI, and details are not repeated herein.

In the circumstance (4) of Scenario VI, the cell that ultimately serves the terminal device (or, as understood in a different way, the cell that ultimately holds (or establishes) an RRC connection to the terminal device in this CHO procedure) is the cell A. The MRO information recorded by the terminal device is the same as the MRO-related information recorded in the circumstance (3) of Scenario VI. For the relevant description, reference may be made to the description of the circumstance (3) of Scenario VI, and details are not repeated herein.

In step S602:

In a possible implementation, the terminal device triggers the sending of the MRO-related information. For example, based on the received conditional handover configuration information, the terminal device successfully hands over to the candidate cell that meets the handover trigger condition. Therefore, the terminal device may send the MRO-related information recorded in this CHO procedure to a network device to which the cell that ultimately serves the terminal device in this CHO procedure belongs. For example, in Scenario II, the terminal device successfully hands over to the candidate cell C, and therefore, the terminal device may send the MRO-related information recorded in this CHO procedure to a network device to which the cell C belongs. Optionally, the network device to which the cell that ultimately serves the terminal device in this CHO procedure belongs may send, to the source network device, the MRO-related information received from the terminal device. For example, in Scenario II, the network device to which the cell C belongs sends the MRO-related information received from the terminal device to a network device to which the cell A belongs (that is, the source network device).

Alternatively, for example, when the terminal device fails in handing over to the candidate cell based on the received conditional handover configuration information, if the terminal device initiates a re-establishment procedure and the re-establishment succeeds, in other words, the cell that ultimately serves the terminal device in this CHO procedure is a cell to which an RRC connection is re-established, the terminal device may send the MRO-related information recorded in this CHO procedure to a network device to which the cell that ultimately serves the terminal device in this CHO procedure belongs. For example, in the circumstance (1) of Scenario I or the circumstance (2) of Scenario I, the terminal device successfully re-establishes an RRC connection to the cell D, and therefore, the terminal device may send the MRO-related information recorded in this CHO procedure to a network device to which the cell D belongs. Optionally, the network device to which the cell that ultimately serves the terminal device in this CHO procedure belongs may send, to the source network device, the MRO-related information received from the terminal device. For example, in the circumstance (1) of Scenario I or the circumstance (2) of Scenario I, the network device to which the cell D belongs sends the MRO-related information received from the terminal device to a network device to which the cell A belongs (that is, the source network device).

Alternatively, for example, when the terminal device fails in handing over to the candidate cell based on the received conditional handover configuration information, if the terminal device remains in the source cell, in other words, the cell that ultimately serves the terminal device in this CHO procedure is the source cell, the terminal device may send the MRO-related information recorded in this CHO procedure to a network device to which the cell that ultimately serves the terminal device in this CHO procedure belongs. For example, in the circumstance (3) of Scenario I, the terminal device remains in the source cell after this CHO procedure, and therefore, the terminal device may send the MRO-related information recorded in this CHO procedure to a network device to which the cell A belongs (that is, the source network device). The network device may adjust a conditional handover-related parameter based on the received MRO-related information.

In another possible implementation, the terminal device triggers the sending of the MRO-related information after receiving a request message sent by the second network device. For example, the request message may be a UEInformationRequest (UEInformationRequest) message. This implementation is described in detail below.

Optionally, in this embodiment of this application, if the terminal device is capable of recording the MRO-related information, the terminal device may send third indication information to the second network device. The third indication information is used to notify the second network device that the terminal device is capable of recording the MRO-related information. The third indication information may be contained in an RRC message. The RRC message may be, for example, an RRC establishment complete message or an RRC reconfiguration complete message or an RRC re-establishment complete message or another RRC message. This is not specifically limited in this embodiment of this application. Alternatively, the third indication information may be contained in a physical layer message (such as uplink control information (UCI)) or a media access control (MAC) layer message (such as a media access control element (MAC CE)). This is not specifically limited in this embodiment of this application. With respect to an occasion of sending the third indication information, for example, in a possible implementation, the third indication information may be sent when the terminal device sends the RRC re-establishment complete message after re-establishment succeeds; in another possible implementation, the third indication information may be sent when the terminal device sends the RRC reconfiguration complete message to a successfully accessed network device after a conditional handover is performed successfully. This is not specifically limited in this embodiment of this application.

Optionally, in this embodiment of this application, the third indication information may be a binary value. For example, "1" indicates that the terminal device is capable of recording the MRO-related information, and "0" indicates that the terminal device is not capable of recording the MRO-related information. Alternatively, the third indication information may be a Boolean value. For example, "TRUE" indicates that the terminal device is capable of recording the MRO-related information, and "FALSE" indicates that the terminal device is not capable of recording the MRO-related information. Alternatively, the third indication information may be an information element. For example, the information element may be a mobility robustness optimization capability (such as MRO capability) information element, or the information element may be represented or named in other forms. This is not specifically limited in this embodiment of this application. If the message sent by the terminal device contains the information element, it indicates that the terminal device is capable of recording the MRO-related information. If the message sent by the terminal device does not contain the information element, it indicates that the terminal device is not capable of recording the MRO-related information.

After receiving the third indication information from the terminal device, the second network device may send the request message to the terminal device to request the terminal device to report the MRO-related information. For example, the request message may be a UEInformationRequest message.

Optionally, in this embodiment of this application, the second network device may send the request message to the terminal device after receiving the third indication information sent by the terminal device, or the second network device may send the request message to the terminal device without receiving the third indication information. In other words, whether the third indication information is received is not a necessary condition for the second network device to send the request message. This is not specifically limited in this embodiment of this application.

In a possible implementation, the second network device may be a network device to which a cell belongs, where the cell is a successfully accessed cell that meets the handover trigger condition as determined by the terminal device based on the currently received conditional handover configuration information. If two candidate cells, that is, the cell B and the cell C, are configured in the conditional handover configuration information, and the terminal device determines, based on the conditional handover configuration information, that the cell C meets the handover trigger condition, and the terminal device successfully accesses the cell C, a network device to which the cell C belongs is the second network device.

In another possible implementation, the second network device is a network device to which a cell belongs, where the cell is a cell to which RRC connection re-establishment is initiated by the terminal device after the terminal device receives the conditional handover configuration information. For example, the terminal device initiates a re-establishment procedure if: the terminal device determines, based on the currently received conditional handover configuration information, that none of the configured M candidate cells meets the handover trigger condition; or at least one cell among the configured M candidate cells meets the handover trigger condition but the terminal device fails in accessing the at least one cell that meets the handover trigger condition; or other circumstances occur. Therefore, the network device to which the cell determined by the terminal device for re-establishment belongs is the second network device. For example, the terminal device selects an appropriate new cell E according to the S criterion, performs an RRC re-establishment procedure with the cell E, and successfully re-establishes an RRC connection to the cell E. Therefore, a network device to which the cell E belongs is the second network device.

In another possible implementation, the second network device may be a network device to which a subsequently accessed cell belongs, where the cell is successfully accessed by the terminal device after the terminal device receives the conditional handover configuration information. For example, after the terminal device determines, based on the currently received conditional handover configuration information, a cell that meets the handover trigger condition, and after the terminal device successfully hands over to the cell, the terminal device may subsequently access another network device due to further movement or initiation of re-establishment or other reasons. The network device receives the third indication information sent by the terminal device, or the network device sends, to the terminal device, the request message requesting the terminal device to report the MRO-related information. Therefore, the network device is the second network device.

In another possible implementation, after receiving the conditional handover configuration information, the terminal device initiates a re-establishment procedure. After the re-establishment succeeds, the terminal device may subsequently access another network device due to further movement or initiation of re-establishment or other reasons. The another network device receives the third indication information sent by the terminal device, or, the another network device sends the request message to the terminal device (for example, sends a UEInformationRequest message to the terminal device). Therefore, the another network device is the second network device. For example, two candidate cells (such as the cell B and the cell C) are configured in the conditional handover configuration information. The terminal device determines, based on the conditional handover configuration information, that the cell C meets the handover trigger condition, and the terminal device successfully accesses the cell C. After the terminal device successfully hands over to the cell C, a network device to which the cell C belongs does not send a UEInformationRequest message to the UE. Therefore, the terminal device does not send the MRO-related information to the network device to which the cell C belongs. Subsequently, due to further movement or initiation of re-establishment or other reasons, the terminal device successfully accesses a cell F. After receiving a request message (such as a UEInformationRequest message) sent by a network device to which the cell F belongs, the terminal device sends the MRO-related information to the network device to which the cell F belongs.

Optionally, in this embodiment of this application, the first failure cause value corresponding to the candidate target cell and/or the second failure cause value corresponding to the to-be-determined cell in the MRO-related information may be sent through an RRC message. For example, the RRC message may be a UEInformationReponse message. This is not specifically limited in this embodiment of this application. In an implementation, the terminal device uses a message 2 to send the first failure cause value corresponding to the candidate target cell and/or the second failure cause value corresponding to the to-be-determined cell. The message 2 may be an RRC message such as a UEInformationReponse message. Optionally, the message 2 may further include the first information carried in the MRO-related information. In other words, the first information and the first failure cause value corresponding to the candidate target cell and/or the second failure cause value corresponding to the to-be-determined cell may be sent through the same RRC message. For the relevant description of the first information, reference may be made to the foregoing description of the first information, and details are not repeated herein. Alternatively, the first information may be sent through another RRC message such as a message 3. In other words, the first information and the first failure cause value corresponding to the candidate target cell and/or the second failure cause value corresponding to the to-be-determined cell may be sent through different RRC messages. The message 3 may be an RRC message such as a UEInformationReponse message. This is not specifically limited in this embodiment of this application. Optionally, in this embodiment of this application, the message 2 may further contain the second information carried in the MRO-related information. For the relevant description of the second information, reference may be made to the foregoing description of the second information, and details are not repeated herein. Alternatively, the second information may be contained in the message 3. When the second information is contained in the message 2 or the message 3, the second information may be sent concurrently with the relevant information generated when the conditional handover fails. In other words, the second information may be sent through the same message that is used to send the first information, the first failure cause value corresponding to the candidate target cell, and/or the second failure cause value corresponding to the to-be-determined cell. Optionally, the second information may alternatively be sent separately. For example, the terminal device sends a message 4 to the second network device, and the message 4 contains the second information. The message 4 may be an RRC message such as a UEInformationReponse message. This is not specifically limited in this embodiment of this application.

Optionally, in this embodiment of this application, when the second information is sent separately, a possible circumstance is that the terminal device determines that a cell among the candidate cells meets the handover trigger condition, and successfully performs a random access procedure with the cell to successfully access the cell. For example, when two candidate cells, that is, the cell B and the cell C, are configured, the terminal device receives the conditional handover configuration information and then determines that the cell B meets the handover trigger condition, and successfully accesses the cell B. After the terminal device successfully hands over to the cell B, it may be considered that this CHO procedure ends. In this CHO procedure, the terminal device may record information about the cell B. Because the access to the cell B succeeds, the terminal device may skip determining whether the cell C meets the handover trigger condition, and the terminal device does not record information about the cell C. In this case, in this CHO procedure, the terminal device skips recording information about a failure of the conditional handover. In other words, the terminal device may skip sending the information about the failure of the conditional handover to the second network device. That is, the terminal device skips sending the message 2 or the message 3 to the second network device. For example, the terminal device skips sending the information about the cell C to the second network device, but sends the second information to the second network device, that is, the terminal device sends the message 4 to the second network device. For example, the terminal device sends the information about the cell B to the second network device.

Optionally, in this embodiment of this application, when a conditional handover mechanism coexists with a conventional handover mechanism, the message 2, the message 3, or the message 4 may further contain the third information or the fourth information carried in the MRO information. For the relevant description of the third information and the fourth information, reference may be made to the foregoing description of the corresponding information. Specifically, the terminal device may send information about a failure of a conventional handover together with the relevant information generated in the conditional handover procedure. Specifically, the third information and the fourth information may be sent through the same message that is used to send the first information, the second information, the first failure cause value corresponding to the candidate target cell, and/or the second failure cause value corresponding to the to-be-determined cell; or, the terminal device may use a new message (a message other than the message 2, the message 3, and the message 4) to send information about a failure of a conventional handover. That is, the terminal device may send the information about the failure of the conventional handover separately from the relevant information generated in the conditional handover procedure. This is not specifically limited in this application.

Optionally, in this embodiment of this application, when the terminal device sends the MRO-related information, if the terminal device sends one or more of the first information, the second information, the third information, the fourth information, and the first failure cause value corresponding to the candidate target cell and/or the second failure cause value corresponding to the to-be-determined cell, the sending may be performed at a granularity of a terminal device or at a granularity of a cell. This is not specifically limited in this application. In an example, all the MRO information is contained in the message 2, and the message 2 is an RRC message. When the terminal device sends the information, the information may be sent through one message 2. Specifically, the terminal device uses one message 2 to send the recorded MRO-related information of the source cell, each candidate target cell and/or to-be-determined cell, the first target cell, and the cell that ultimately serves the terminal device in this CHO procedure. That is, the message 2 is at the granularity of a terminal device. For example, in the circumstance (1) of Scenario III in the foregoing step S601, if the terminal device uses one message 2 to send the MRO-related information in this CHO procedure, the message 2 contains the first failure cause value corresponding to the cell B and the cell C, the information about the cell B, the information about the cell C, the first time information corresponding to the cell B, and the first time information corresponding to the cell C, the information about the cell D, and the information about the cell A. For the first failure cause value, the message 2 may contain only one first failure cause value. Specifically, the first failure cause value corresponds to both the cell B and the cell C; or, the message 2 may contain two first failure cause values, and the two first failure cause values correspond to the cell B and the cell C respectively. This is not specifically limited in this embodiment of this application. The information about the cell A (or the cell B, or the cell C, or the cell D) contains cell identity information of the cell A (or the cell B, or the cell C, or the cell D), and/or cell signal quality information of the cell A (or the cell B, or the cell C, or the cell D).

Alternatively, for example, the terminal device may send the MRO information in a plurality of messages 2. Specifically, the terminal device may send MRO-related information corresponding to each cell separately, where the MRO-related information is recorded by the terminal device, and the cell includes each candidate target cell and/or to-be-determined cell and the first target cell. That is, the message 2 is at the granularity of a cell. It needs to be noted that when the message 2 is sent at the granularity of a cell, the information about the source cell and the information about the cell that ultimately serves the terminal device in this CHO procedure may be sent separately, or may be sent together with the MRO-related information of the candidate target cell or to-be-determined cell. This is not specifically limited in this application. For example, in the circumstance (1) of Scenario III of the foregoing step S601, for the cell B and the cell C, the terminal device may send the information about the cell B through a message 2a. The message 2a contains the first failure cause value corresponding to the cell B and other MRO-related information corresponding to the cell B (for example, the information about the cell B, and the first time information corresponding to the cell B). The terminal device may send the information about the cell C through another message 2b. The message 2b contains the first failure cause value corresponding to the cell C and other MRO-related information corresponding to the cell C (for example, the information about the cell C, and the first time information corresponding to the cell C). For the source cell A and the cell D to which an RRC connection is re-established, the information about the cell A (for example, information specific to the cell A) may be sent through another message 2c, the message 2a, or the message 2b, and the information about the cell D (for example, information specific to the cell D) may be sent through another message 2d, or the message 2a, or the message 2b, or the message 2c. This is not specifically limited in this embodiment of this application. The information about the cell A (or cell B, or cell C, or cell D) includes cell identity information of the cell A (or cell B, or cell C, or cell D), and/or cell signal quality information of the cell A (or cell B, or cell C, or cell D).

In step S603:

It needs to be noted that, when the network device that sends, to the terminal device, the request message requesting the terminal device to report the MRO-related information is the network device to which the source cell belongs, the second network device and the first network device are the same network device. In this case, step S603 does not need to be performed.

Optionally, in this embodiment of this application, when the second network device sends the MRO-related information to the first network device, the MRO-related information may be contained in one message for sending, or different content included in the MRO-related information may be sent through different messages; or, as understood in a different way, in sending the MRO-related information, the sending may be performed at the granularity of a terminal device or at the granularity of a cell. This is not specifically limited in this embodiment of this application. For the relevant description, reference may be made to the corresponding description in step S602, and details are not repeated herein.

Optionally, in this embodiment of this application, for the candidate target cell corresponding to the first failure cause value, one possible cause for an access failure is that the quality of the candidate target cell is relatively low all along, or, signal quality of the candidate target cell attenuates rapidly or is volatile. After receiving the first failure cause value corresponding to the candidate target cell, the second network device sends, to the first network device, the received first failure cause value corresponding to the candidate target cell.

After receiving the first failure cause value, the first network device may perform corresponding processing according to the first failure cause value. For example, according to the first failure cause value, the first network device reconfigures another candidate cell or adjusts a relevant parameter of a previously configured candidate cell (also understood as configuring a conditional handover-related parameter). In a possible implementation, when the first network device subsequently configures a candidate cell, for example, in a next or subsequent CHO procedure, the candidate target cell may be excluded, that is, the candidate target cell is not configured as a candidate cell any more. In this way, in a next or subsequent conditional handover, the terminal device no longer needs to determine whether the candidate target cell meets the handover trigger condition, thereby reducing energy consumption of the terminal device and implementation complexity of the terminal device.

Alternatively, another possible cause for an access failure is that the handover trigger condition configured by the first network device is unreasonable. For example, a handover triggering criterion configured for the handover trigger condition is unreasonable (in an example in which the event A3 is configured, the parameter Q configured by the first network device for the event may be slightly low). The terminal device determines, based on the conditional handover configuration information, that a candidate cell meets the handover trigger condition. Although the candidate cell meets the handover trigger condition, signal quality of the cell does not meet a requirement for successful access of the terminal device. Therefore, the terminal device fails in accessing the cell. After receiving the first failure cause value corresponding to the candidate target cell, the second network device sends, to the first network device, the received first failure cause value corresponding to the candidate target cell.

After receiving the first failure cause value, the first network device may perform corresponding processing according to the first failure cause value. For example, according to the first failure cause value, the first network device reconfigures another candidate cell or adjusts a relevant parameter of a previously configured candidate cell (also understood as configuring a conditional handover-related parameter). In a possible implementation, in an example in which the event A3 is configured, the first network device may increase the value of the configured parameter Q when subsequently configuring the handover trigger condition.

It needs to be noted that a network device that configures the candidate cell may be the first network device or a network device to which the candidate cell belongs.

Optionally, in this embodiment of this application, for the to-be-determined cell corresponding to the second failure cause value, a possible cause for not meeting the handover trigger condition is that signal quality of the to-be-determined cell is low all along. After receiving the second failure cause value corresponding to the to-be-determined cell, the second network device sends, to the first network device, the received second failure cause value corresponding to the to-be-determined cell.

After receiving the second failure cause value, the first network device may perform corresponding processing according to the second failure cause value. For example, according to the second failure cause value, the first network device reconfigures another candidate cell or adjusts a relevant parameter of a previously configured candidate cell (also understood as configuring a conditional handover-related parameter). In a possible implementation, when the first network device subsequently configures a candidate cell (for example, in a next or subsequent CHO procedure), the to-be-determined cell is excluded, that is, the to-be-determined cell is not configured as a candidate cell any more. Therefore, in a next or subsequent conditional handover, the terminal device no longer needs to determine whether the to-be-determined cell meets the handover trigger condition, thereby reducing energy consumption of the terminal device and implementation complexity of the terminal device.

Alternatively, another possible cause for not meeting the handover trigger condition is that signal quality of the to-be-determined cell is relatively high, but the handover trigger condition configured by the first network device is unreasonable (in an example in which the event A3 is configured, the parameter Q configured for the event may be slightly high, or, in an example in which the event A5 is configured, the parameter K configured for the event A5 may be slightly high and/or the configured parameter L is slightly low). After receiving the second failure cause value corresponding to the to-be-determined cell, the second network device sends, to the first network device, the received second failure cause value corresponding to the to-be-determined cell.

After receiving the second failure cause value, the first network device may perform corresponding processing according to the second failure cause value. For example, according to the second failure cause value, the first network device reconfigures another candidate cell or adjusts a relevant parameter of a previously configured candidate cell (also understood as configuring a conditional handover-related parameter). In a possible implementation, after receiving the second failure cause value corresponding to the to-be-determined cell, the first network device may adjust a relevant parameter appropriately. In an example in which the event A3 is configured, the first network device may decrease the value of the configured parameter Q when subsequently configuring the handover trigger condition.

Optionally, in this embodiment of this application, after receiving the first time information and/or the second time information, the second network device sends the received first time information and/or second time information to the first network device. After receiving the first time information and/or second time information, the first network device may perform corresponding processing according to the first time information and/or second time information. For example, according to the first time information and/or second time information, the first network device reconfigures another candidate cell or adjusts a relevant parameter of a previously configured candidate cell (also understood as configuring a conditional handover-related parameter). In a possible implementation, for a cell to which a conditional handover has failed (such as a candidate target cell or a to-be-determined cell), if, within a time interval from the time point at which the terminal device receives the conditional handover configuration information to a time point at which the terminal device sends the message 2, the network device has reconfigured a relevant parameter (using A3 as an example, has reconfigured the parameter Q) in a handover trigger condition corresponding to the cell to which the conditional handover has failed. In this case, the network device may delete, discard, or ignore relevant information received from the terminal device and corresponding to the cell to which the conditional handover has failed, and not adjust the relevant parameter in the handover trigger condition corresponding to the cell to which the conditional handover has failed.

Optionally, in this embodiment of this application, after receiving the third information or fourth information, the second network device sends the third information or the fourth information to the first network device. After receiving the third information or the fourth information, the first network device may perform corresponding processing according to the third information or the fourth information. For example, the first network device reconfigures a relevant parameter of the conventional handover according to the third information or the fourth information. For example, in a possible implementation, when the terminal device receives a handover message but fails in accessing the second target cell, a possible cause is that the second target cell does not permit access by the terminal device. In a subsequent conventional handover procedure, the first network device may not configure the cell as a target cell, or, in a subsequent conditional handover procedure, the first network device may not configure the cell as a candidate cell. Alternatively, for example, in a possible implementation, the terminal device receives no handover message, and a possible cause is that a parameter configured by the network is unreasonable. In a subsequent conventional handover procedure, the first network device may adjust a parameter in a relevant event in a measurement configuration. Using the event A3 as an example (in the prior art, when configuring the event A3, the first network device configures an offset (such as P); and when signal quality of a neighboring cell is higher than the signal quality of the serving cell by P, the UE triggers reporting of a measurement report), the terminal device may fail in reporting the measurement report because the configured parameter P is too high. Therefore, the network device does not trigger a conventional handover preparation procedure, and the first network device does not send a handover message to the terminal device. Consequently, the terminal device receives no handover message. Therefore, the first network device may subsequently decrease the value of P according to the information about the handover failure, thereby achieving the objective of optimization.

Based on the information transmission method provided in this embodiment of this application, the terminal device sends, to the second network device, the information about the candidate target cell and/or the information about the to-be-determined cell that are/is generated in the conditional handover procedure. For example, the information reported by the terminal device may include: the first failure cause value corresponding to the candidate cell (that is, the candidate target cell) that meets the handover trigger condition and that the terminal device fails in accessing, the second failure cause value corresponding to the candidate cell (that is, the to-be-determined cell) that does not meet the handover trigger condition, the information about the source cell, the information about the candidate target cell, the first time information corresponding to each of the at least one candidate target cell, the information about the to-be-determined cell, the second time information corresponding to each of the at least one to-be-determined cell, and the like. The second network device sends, to the first network device, the information reported by the terminal device, so that the first network device can appropriately optimize the handover parameter under the conditional handover mechanism according to the information about the candidate target cell and/or the information about the to-be-determined cell.

Understandably, in each of the foregoing embodiments, a method and/or step implemented by the terminal device may alternatively be implemented by a component (such as a chip or circuit) usable in the terminal device, a method and/or step implemented by the first network device may alternatively be implemented by a component (such as a chip or circuit) usable in the first network device, and a method and/or step implemented by the second network device may alternatively be implemented by a component (such as a chip or circuit) usable in the second network device.

The foregoing mainly describes the solutions in the embodiments of this application from the perspective of interaction between network elements. Correspondingly, an embodiment of this application further provides a communications apparatus. The communications apparatus is configured to implement any of the foregoing methods. The communications apparatus may be the terminal device in the foregoing method embodiment, or an apparatus that includes the terminal device, or a component (such as a chip or circuit) usable in the terminal device; or, the communications apparatus may be the first network device in the foregoing method embodiment, or an apparatus that includes the first network device, or a component (such as a chip or circuit) usable in the first network device; or, the communications apparatus may be the second network device in the foregoing method embodiment, or an apparatus that includes the second network device, or a component (such as a chip or circuit) usable in the second network device. Understandably, to implement the foregoing functions, the communications apparatus includes a corresponding hardware structure and/or software module for performing each of the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, the communications apparatus may be divided into functional modules according to the foregoing method embodiment. For example, each of the functions may correspond to a functional module, or two or more of the functions may be integrated into one processing module. The integrated module may be implemented in a form of hardware, or may be implemented in a form of a software functional module. It should be noted that, in this embodiment of this application, division into modules is an example, and is merely division into logical functions. In an actual implementation, another division manner may be used.

Figure 7:
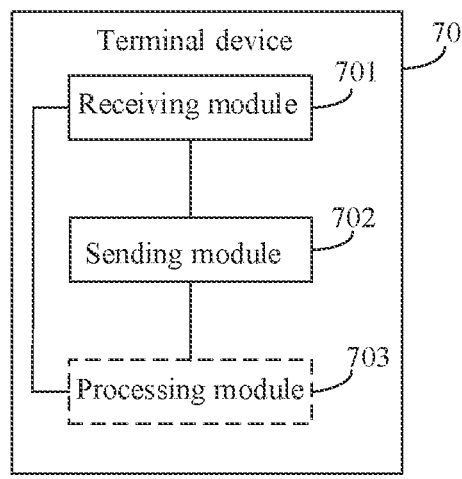
FIG. 7 is still another schematic structural diagram of a terminal device according to an embodiment of this application.

For example, the communications apparatus is the terminal device in the foregoing method embodiment. FIG. 7 is a schematic structural diagram of a terminal device 70. The terminal device 70 includes a receiving module 701 and a sending module 702. The receiving module 701, also known as a receiving unit, is configured to implement a receiving function, and may be, for example, a receiving circuit, a receiver, or a communications interface. The sending module 702, also known as a sending unit, is configured to implement a sending function, and may be, for example, a sending circuit, a transmitter, a transmitter, or a communications interface.

The receiving module 701 is configured to receive conditional handover configuration information. The conditional handover configuration information includes a handover trigger condition and information about M candidate cells, where M is a positive integer. The sending module 702 is configured to send a first failure cause value corresponding to at least one candidate target cell and/or a second failure cause value corresponding to at least one to-be-determined cell. The at least one candidate target cell includes X cells that meet the handover trigger condition among the M candidate cells, and the at least one to-be-determined cell includes Y cells that do not meet the handover trigger condition among the M candidate cells. X and Y are natural numbers, and X+Y is less than or equal to M.

The first failure cause value indicates that the candidate target cell meets the handover trigger condition but the terminal device fails in accessing the candidate target cell. Alternatively, the first failure cause value includes a first-level failure cause value and a second-level failure cause value. The first-level failure cause value indicates that a conditional handover of the terminal device fails. The second-level failure cause value indicates that the candidate target cell meets the handover trigger condition but the terminal device fails in accessing the candidate target cell. The second failure cause value indicates that the to-be-determined cell does not meet the handover trigger condition. Alternatively, the second failure cause value includes a third-level failure cause value and a fourth-level failure cause value. The third-level failure cause value indicates that the conditional handover of the terminal device fails. The fourth-level failure cause value indicates that the to-be-determined cell does not meet the handover trigger condition.

Optionally, the sending module 702 is further configured to send one or more of information about a source cell, information about the candidate target cell, first time information corresponding to each of the at least one candidate target cell, information about the to-be-determined cell, and second time information corresponding to each of the at least one to-be-determined cell. The first time information includes: information about a time interval from a time point at which the terminal device receives the conditional handover configuration information to a time point at which the terminal device triggers a handover to a first candidate target cell, information about a time interval from the time point at which the terminal device triggers the handover to the first candidate target cell to a time point at which the terminal device fails in accessing the first candidate target cell, and information about a time interval from the time point at which the terminal device fails in accessing the first candidate target cell to a time point at which the terminal device sends the first failure cause value and/or the second failure cause value. The first candidate target cell is any one of the at least one candidate target cell.

The second time information includes: information about a time interval from the time point at which the terminal device receives the conditional handover configuration information to a time point at which the terminal device determines that a first to-be-determined cell does not meet the handover trigger condition, and information about a time interval from the time point at which the terminal device determines that the first to-be-determined cell does not meet the handover trigger condition to the time point at which the terminal device sends the first failure cause value and/or the second failure cause value. The first to-be-determined cell is any one of the at least one to-be-determined cell. Alternatively, the second time information includes: information about a time interval from the time point at which the terminal device receives the conditional handover configuration information to a time point at which the terminal device stops assessing whether the first to-be-determined cell meets the handover trigger condition, and information about a time interval from the time point at which the terminal device stops assessing whether the first to-be-determined cell meets the handover trigger condition to the time point at which the terminal device sends the first failure cause value and/or the second failure cause value.

Optionally, the sending module 702 is further configured to send one or more of information about a first target cell, and a third cause value and third time information that correspond to the first target cell. The first target cell is a cell successfully accessed by the terminal device among the M candidate cells.

The third cause value indicates that the terminal device successfully performs the conditional handover. The third time information includes: information about a time interval from the time point at which the terminal device receives the conditional handover configuration information to a time point at which the terminal device triggers a handover to the first target cell, information about a time interval from the time point at which the terminal device triggers the handover to the first target cell to a time point at which the terminal device successfully accesses the first target cell, and information about a time interval from the time point at which the terminal device successfully accesses the first target cell to a time point at which the terminal device sends the one or more of the information about the first target cell, the third cause value, and the third time information.

Optionally, the terminal device 70 further includes a processing module 703. The processing module 703 is configured to determine, before the first target cell is successfully accessed, that the receiving module 701 receives no radio resource control RRC reconfiguration message.

Optionally, the receiving module 701 is further configured to receive an RRC reconfiguration message before the first target cell is successfully accessed, where the RRC reconfiguration message contains information about a second target cell. The processing module 703 is further configured to determine that access to the second target cell fails.

All related content of the steps in the foregoing method embodiment may be cited in the description of functions of corresponding functional modules, and details are not repeated herein.

In this embodiment, the terminal device 70 is presented in a form of functional modules obtained through integration. The "module" herein may mean a specific ASIC, a circuit, a processor and a memory for executing one or more software or firmware programs, an integrated logic circuit, and/or another device capable of providing any of the foregoing functions. In a simple embodiment, a person skilled in the art may be aware that the terminal device 70 may be in the form of the terminal device shown in FIG. 2 or FIG. 4.

For example, the processor 401 in the terminal device shown in FIG. 2 or FIG. 4 may invoke the computer-executable instruction stored in the memory 402, so as to cause the terminal device to perform the information transmission method according to the foregoing method embodiment.

The functions or the implementation procedures of the receiving module 701, the sending module 702, and the processing module 703 in FIG. 7 may be implemented by the processor 401 in the terminal device shown in FIG. 2 or FIG. 4 by invoking the computer-executable instruction stored in the memory 402. Alternatively, the functions or the implementation procedures of the receiving module 701 and the sending module 702 in FIG. 7 may be implemented by the transceiver 403 in the terminal device shown in FIG. 2 or FIG. 4, and the functions or the implementation procedures of the processing module 703 in FIG. 7 may be implemented by the processor 401 in the terminal device shown in FIG. 2 or FIG. 4 by invoking the computer-executable instruction stored in the memory 402.

The terminal device 70 provided in this embodiment can implement the information transmission method, and therefore, reference may be made to the method embodiment for technical effects that can be achieved by the terminal device 70, and details are not repeated herein.

Figure 8:
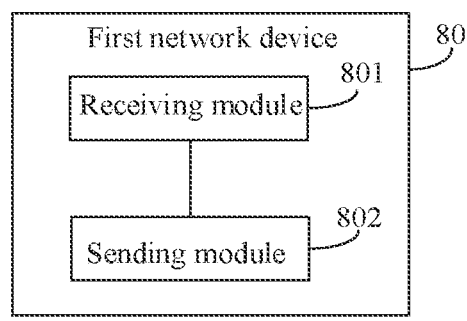
FIG. 8 is still another schematic structural diagram of a first network device according to an embodiment of this application.

Alternatively, for example, the communications apparatus is the first network device in the foregoing method embodiment. FIG. 8 is a schematic structural diagram of a first network device. The first network device 80 includes a receiving module 801 and a sending module 802. The receiving module 801, also known as a receiving unit, is configured to implement a receiving function, and may be, for example, a receiving circuit, a receiver, a receiver, or a communications interface. The sending module 802, also known as a sending unit, is configured to implement a sending function, and may be, for example, a sending circuit, a transmitter, a transmitter, or a communications interface.

The sending module 802 is configured to send conditional handover configuration information to a terminal device. The conditional handover configuration information includes a handover trigger condition and information about M candidate cells, where M is a positive integer. The receiving module 801 is configured to receive, from a second network device, a first failure cause value corresponding to at least one candidate target cell and/or a second failure cause value corresponding to at least one to-be-determined cell. The at least one candidate target cell includes X cells that meet the handover trigger condition among the M candidate cells, and the at least one to-be-determined cell includes Y cells that do not meet the handover trigger condition among the M candidate cells. X and Y are natural numbers, and X+Y is less than or equal to M.

The first failure cause value indicates that the candidate target cell meets the handover trigger condition but the terminal device fails in accessing the candidate target cell. Alternatively, the first failure cause value includes a first-level failure cause value and a second-level failure cause value. The first-level failure cause value indicates that a conditional handover of the terminal device fails. The second-level failure cause value indicates that the candidate target cell meets the handover trigger condition but the terminal device fails in accessing the candidate target cell. The second failure cause value indicates that the to-be-determined cell does not meet the handover trigger condition. Alternatively, the second failure cause value includes a third-level failure cause value and a fourth-level failure cause value. The third-level failure cause value indicates that the conditional handover of the terminal device fails. The fourth-level failure cause value indicates that the to-be-determined cell does not meet the handover trigger condition.

Optionally, the receiving module 801 is further configured to receive, from the second network device, one or more of information about a source cell, information about the candidate target cell, first time information corresponding to each of the at least one candidate target cell, information about the to-be-determined cell, and second time information corresponding to each of the at least one to-be-determined cell.

The first time information includes: information about a time interval from a time point at which the terminal device receives the conditional handover configuration information to a time point at which the terminal device triggers a handover to a first candidate target cell, information about a time interval from the time point at which the terminal device triggers the handover to the first candidate target cell to a time point at which the terminal device fails in accessing the first candidate target cell, and information about a time interval from the time point at which the terminal device fails in accessing the first candidate target cell to a time point at which the terminal device sends the first failure cause value and/or the second failure cause value. The first candidate target cell is any one of the at least one candidate target cell.

The second time information includes: information about a time interval from the time point at which the terminal device receives the conditional handover configuration information to a time point at which the terminal device determines that a first to-be-determined cell does not meet the handover trigger condition, and information about a time interval from the time point at which the terminal device determines that the first to-be-determined cell does not meet the handover trigger condition to the time point at which the terminal device sends the first failure cause value and/or the second failure cause value. The first to-be-determined cell is any one of the at least one to-be-determined cell. Alternatively, the second time information includes: information about a time interval from the time point at which the terminal device receives the conditional handover configuration information to a time point at which the terminal device stops assessing whether the first to-be-determined cell meets the handover trigger condition, and information about a time interval from the time point at which the terminal device stops assessing whether the first to-be-determined cell meets the handover trigger condition to the time point at which the terminal device sends the first failure cause value and/or the second failure cause value.

Optionally, the receiving module 801 is further configured to receive, from the second network device, one or more of information about a first target cell, and a third cause value and third time information that correspond to the first target cell. The first target cell is a cell successfully accessed by the terminal device among the M candidate cells.

The third cause value indicates that the terminal device successfully performs the conditional handover. The third time information includes: information about a time interval from the time point at which the terminal device receives the conditional handover configuration information to a time point at which the terminal device triggers a handover to the first target cell, information about a time interval from the time point at which the terminal device triggers the handover to the first target cell to a time point at which the terminal device successfully accesses the first target cell, and information about a time interval from the time point at which the terminal device successfully accesses the first target cell to a time point at which the terminal device sends the one or more of the information about the first target cell, the third cause value, and the third time information.

All related content of the steps in the foregoing method embodiment may be cited in the description of functions of corresponding functional modules, and details are not repeated herein.

In this embodiment, the first network device 80 is presented in a form of functional modules obtained through integration. The "module" herein may mean a specific ASIC, a circuit, a processor and a memory for executing one or more software or firmware programs, an integrated logic circuit, and/or another device capable of providing any of the foregoing functions. In a simple embodiment, a person skilled in the art may be aware that the first network device 80 may be in the form of the first network device shown in FIG. 2.

For example, the processor 301*a* in the first network device shown in FIG. 2 may invoke a computer-executable instruction stored in the memory 302*a*, so as to cause the first network device to perform the information transmission method according to the foregoing method embodiment.

Specifically, the functions or the implementation procedures of the receiving module 801 and the sending module 802 in FIG. 8 may be implemented by the transceiver 303*a* in the first network device shown in FIG. 2.

The first network device 80 provided in this embodiment can implement the information transmission method, and therefore, reference may be made to the method embodiment for technical effects that can be achieved by the first network device 80, and details are not repeated herein.

Figure 9:
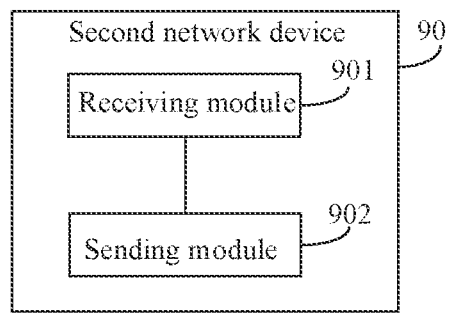
FIG. 9 is still another schematic structural diagram of a second network device according to an embodiment of this application.

Alternatively, for example, the communications apparatus is the second network device in the foregoing method embodiment. FIG. 9 is a schematic structural diagram of a second network device. The second network device 90 includes a receiving module 901 and a sending module 902. The receiving module 901, also known as a receiving unit, is configured to implement a receiving function, and may be, for example, a receiving circuit, a receiver, a receiver, or a communications interface. The sending module 902, also known as a sending unit, is configured to implement a sending function, and may be, for example, a sending circuit, a transmitter, a transmitter, or a communications interface.

The receiving module 901 is configured to receive, from a terminal device, a first failure cause value corresponding to at least one candidate target cell and/or a second failure cause value corresponding to at least one to-be-determined cell. The at least one candidate target cell includes X cells that meet a handover trigger condition among M candidate cells, and the at least one to-be-determined cell includes Y cells that do not meet the handover trigger condition among the M candidate cells. X and Y are natural numbers, and X+Y is less than or equal to M. The M candidate cells and the handover trigger condition are configured through conditional handover configuration information.

The first failure cause value indicates that the candidate target cell meets the handover trigger condition but the terminal device fails in accessing the candidate target cell. Alternatively, the first failure cause value includes a first-level failure cause value and a second-level failure cause value. The first-level failure cause value indicates that a conditional handover of the terminal device fails. The second-level failure cause value indicates that the candidate target cell meets the handover trigger condition but the terminal device fails in accessing the candidate target cell. The second failure cause value indicates that the to-be-determined cell does not meet the handover trigger condition. Alternatively, the second failure cause value includes a third-level failure cause value and a fourth-level failure cause value. The third-level failure cause value indicates that the conditional handover of the terminal device fails. The fourth-level failure cause value indicates that the to-be-determined cell does not meet the handover trigger condition.

Optionally, the receiving module 901 is further configured to receive, from the terminal device, one or more of information about a source cell, information about the candidate target cell, first time information corresponding to each of the at least one candidate target cell, information about the to-be-determined cell, and second time information corresponding to each of the at least one to-be-determined cell.

The first time information includes: information about a time interval from a time point at which the terminal device receives the conditional handover configuration information to a time point at which the terminal device triggers a handover to a first candidate target cell, information about a time interval from the time point at which the terminal device triggers the handover to the first candidate target cell to a time point at which the terminal device fails in accessing the first candidate target cell, and information about a time interval from the time point at which the terminal device fails in accessing the first candidate target cell to a time point at which the terminal device sends the first failure cause value and/or the second failure cause value. The first candidate target cell is any one of the at least one candidate target cell.

The second time information includes: information about a time interval from the time point at which the terminal device receives the conditional handover configuration information to a time point at which the terminal device determines that a first to-be-determined cell does not meet the handover trigger condition, and information about a time interval from the time point at which the terminal device determines that the first to-be-determined cell does not meet the handover trigger condition to the time point at which the terminal device sends the first failure cause value and/or the second failure cause value. The first to-be-determined cell is any one of the at least one to-be-determined cell. Alternatively, the second time information includes: information about a time interval from the time point at which the terminal device receives the conditional handover configuration information to a time point at which the terminal device stops assessing whether the first to-be-determined cell meets the handover trigger condition, and information about a time interval from the time point at which the terminal device stops assessing whether the first to-be-determined cell meets the handover trigger condition to the time point at which the terminal device sends the first failure cause value and/or the second failure cause value.

Optionally, the receiving module 901 is further configured to receive, from the terminal device, one or more of information about a first target cell, and a third cause value and third time information that correspond to the first target cell. The first target cell is a cell successfully accessed by the terminal device among the M candidate cells.

The third cause value indicates that the terminal device successfully performs the conditional handover. The third time information includes: information about a time interval from the time point at which the terminal device receives the conditional handover configuration information to a time point at which the terminal device triggers a handover to the first target cell, information about a time interval from the time point at which the terminal device triggers the handover to the first target cell to a time point at which the terminal device successfully accesses the first target cell, and information about a time interval from the time point at which the terminal device successfully accesses the first target cell to a time point at which the terminal device sends the one or more of the information about the first target cell, the third cause value, and the third time information.

The sending module 902 is configured to send, to a first network device, the first failure cause value corresponding to the candidate target cell and/or the second failure cause value corresponding to the to-be-determined cell. The at least one candidate target cell includes the X cells that meet the handover trigger condition among the M candidate cells, and the at least one to-be-determined cell includes the Y cells that do not meet the handover trigger condition among the M candidate cells. X and Y are natural numbers, and X+Y is less than or equal to M. The M candidate cells and the handover trigger condition are configured through the conditional handover configuration information.

Optionally, the sending module 902 is further configured to send, to the first network device, the one or more of the information about the source cell, the information about the candidate target cell, the first time information corresponding to each of the at least one candidate target cell, the information about the to-be-determined cell, and the second time information corresponding to each of the at least one to-be-determined cell.

Optionally, the sending module 902 is further configured to send, to the first network device, the one or more of the information about the first target cell, and the third cause value and the third time information that correspond to the first target cell. The first target cell is the cell successfully accessed by the terminal device among the M candidate cells.

All related content of the steps in the foregoing method embodiment may be cited in the description of functions of corresponding functional modules, and details are not repeated herein.

In this embodiment, the second network device 90 is presented in a form of functional modules obtained through integration. The "module" herein may mean a specific ASIC, a circuit, a processor and a memory for executing one or more software or firmware programs, an integrated logic circuit, and/or another device capable of providing any of the foregoing functions. In a simple embodiment, a person skilled in the art may be aware that the second network device 90 may be in the form of the second network device shown in FIG. 2.

For example, the processor 301b in the second network device shown in FIG. 2 may invoke a computer-executable instruction stored in the memory 302b, so as to cause the second network device to perform the information transmission method according to the foregoing method embodiment.

Specifically, the functions or the implementation procedures of the receiving module 901 and the sending module 902 in FIG. 9 may be implemented by the transceiver 303b in the second network device shown in FIG. 2.

The second network device 90 provided in this embodiment can implement the information transmission method, and therefore, reference may be made to the method embodiment for technical effects that can be achieved by the second network device 90, and details are not repeated herein.

Optionally, an embodiment of this application further provides a communications apparatus (for example, the communications apparatus may be a chip or a chip system). The communications apparatus includes a processor that is configured to implement the method described in any of the method embodiments. In a possible design, the communications apparatus further includes a memory. The memory is configured to store necessary program instructions and data. The processor can invoke program code stored in the memory to instruct the communications apparatus to implement the method in any of the method embodiments. Alternatively, the memory may be not included in the communications apparatus. When the communications apparatus is a chip system, the communications apparatus may include a chip, or may include a chip and other discrete devices. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatus.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely examples of description of this application defined by the accompanying claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication apparatus, which is a terminal device or an apparatus in the terminal device, the communication apparatus comprising:
    at least one processor, and
    one or more memories coupled to the at least one processor and storing programming instructions for execution by the at least one processor to perform operations comprising:
    receiving conditional handover configuration information, the conditional handover configuration information comprising a handover trigger condition and information about M candidate cells, and M being a positive integer;
    determining, upon receiving the conditional handover configuration information, whether the M candidate cells meet the handover trigger condition; and stopping determining, in response to that a random access attempt is initiated by the terminal device, whether the M candidate cells meets the handover trigger condition.

2. The apparatus according to claim 1, wherein the random access attempt comprises: determining, according to the conditional handover configuration information, that a first candidate cell meets the handover trigger condition, and performing, by the terminal device, a random access to the first candidate cell.

3. The apparatus according to claim 1, wherein the operations further comprise:
sending a first failure cause value corresponding to at least one candidate target cell, or a second failure cause value corresponding to at least one to-be-determined cell; and
wherein the at least one candidate target cell comprises X cells that meet the handover trigger condition and that the terminal device fails in accessing among the M candidate cells, and the at least one to-be-determined cell comprises Y cells that do not meet the handover trigger condition among the M candidate cells, wherein X and Y are natural numbers, and X+Y is less than or equal to M.

4. The apparatus according to claim 3, wherein:
the first failure cause value indicates that the at least one candidate target cell meets the handover trigger condition but the terminal device fails in accessing the at least one candidate target cell; or
the first failure cause value comprises a first-level failure cause value and a second-level failure cause value, the first-level failure cause value indicates that a conditional handover of the terminal device fails, and the second-level failure cause value indicates that the at least one candidate target cell meets the handover trigger condition and the terminal device fails in accessing the at least one candidate target cell.

5. The apparatus according to claim 3, wherein:
the second failure cause value indicates that the at least one to-be-determined cell does not meet the handover trigger condition; or
the second failure cause value comprises a third-level failure cause value and a fourth-level failure cause value, the third-level failure cause value indicates that a conditional handover of the terminal device fails, and the fourth-level failure cause value indicates that the at least one to-be-determined cell does not meet the handover trigger condition.

6. The apparatus according to claim 3, wherein the operations further comprise:
sending one or more of following information:
information about a source cell, information about the at least one candidate target cell, first time information corresponding to each of the at least one candidate target cell, information about the at least one to-be-determined cell, or second time information corresponding to each of the at least one to-be-determined cell.

7. The apparatus according to claim 6, wherein the first time information comprises:
information about a time interval from a time point at which the terminal device receives the conditional handover configuration information to a time point at which the terminal device triggers a handover to a first candidate target cell,
information about a time interval from the time point at which the terminal device triggers the handover to the first candidate target cell to a time point at which the terminal device fails in accessing the first candidate target cell, and
information about a time interval from the time point at which the terminal device fails in accessing the first candidate target cell to a time point at which the terminal device sends at least one of the first failure cause value or the second failure cause value, wherein the first candidate target cell is one of the at least one candidate target cell.

8. The apparatus according to claim 6, wherein:
the second time information comprises:
information about a time interval from a time point at which the terminal device receives the conditional handover configuration information to a time point at which the terminal device determines that a first to-be-determined cell does not meet the handover trigger condition, and information about a time interval from the time point at which the terminal device determines that the first to-be-determined cell does not meet the handover trigger condition to a time point at which the terminal device sends the first failure cause value and/or the second failure cause value, wherein the first to-be-determined cell is one of the at least one to-be-determined cell; or
the second time information comprises:
information about a time interval from the time point at which the terminal device receives the conditional handover configuration information to a time point at which the terminal device stops assessing whether the first to-be-determined cell meets the handover trigger condition, and information about a time interval from the time point at which the terminal device stops assessing whether the first to-be-determined cell meets the handover trigger condition to the time point at which the terminal device sends the first failure cause value and/or the second failure cause value.

9. The apparatus according to claim 1, wherein the operations further comprise:
sending one or more of following information:
information about a first target cell, or a third cause value and third time information that correspond to the first target cell, wherein the first target cell is a cell successfully accessed by the terminal device among the M candidate cells.

10. The apparatus according to claim 9, wherein before the terminal device successfully accesses the first target cell, the operations further comprises:
determining that no radio resource control (RRC) reconfiguration message is received, the RRC reconfiguration message instructing the terminal device to perform a conventional handover; or
receiving the RRC reconfiguration message and determining that access to a second target cell fails, the RRC reconfiguration message comprising information about the second target cell.

11. The communication apparatus according to claim 1, wherein M is greater than or equal to 2.

12. A communication apparatus, comprising:
at least one processor, and
one or more memories coupled to the at least one processor and storing programming instructions for execution by the at least one processor to perform operations comprising:
sending conditional handover configuration information to a terminal device, the conditional handover configuration information comprising a handover trigger condition and information about M candidate cells, and M being a positive integer; and receiving, from the terminal device in response to sending the conditional handover configuration information, a first failure cause value corresponding to at least one candidate target cell of the terminal device, or a second failure cause value corresponding to at least one to-be-determined cell of the terminal device, the at least one candidate target cell comprising X cells that meet the handover trigger condition and that the terminal device fails in accessing among the M candidate cells, and the at least one to-be-determined cell comprising Y cells that do not meet the handover trigger condition among the M candidate cells, X and Y are natural numbers, and X+Y is less than or equal to M.

13. The apparatus according to claim 12, wherein:
the first failure cause value indicates that the at least one candidate target cell meets the handover trigger condition but the terminal device fails in accessing the at least one candidate target cell; or
the first failure cause value comprises a first-level failure cause value and a second-level failure cause value, the first-level failure cause value indicates that a conditional handover of the terminal device fails, and the second-level failure cause value indicates that the at least one candidate target cell meets the handover trigger condition and the terminal device fails in accessing the at least one candidate target cell.

14. The apparatus according to claim 12, wherein:
the second failure cause value indicates that the at least one to-be-determined cell does not meet the handover trigger condition; or
the second failure cause value comprises a third-level failure cause value and a fourth-level failure cause value, the third-level failure cause value indicates that a conditional handover of the terminal device fails, and the fourth-level failure cause value indicates that the at least one to-be-determined cell does not meet the handover trigger condition.

15. The apparatus according to claim 12, wherein the operations further comprise:
receiving one or more of following information:
information about a source cell, information about the at least one candidate target cell, first time information corresponding to each of the at least one candidate target cell, information about the at least one to-be-determined cell, or second time information corresponding to each of the at least one to-be-determined cell.

16. The apparatus according to claim 15, wherein the first time information comprises:
information about a time interval from a time point at which the terminal device receives the conditional handover configuration information to a time point at which the terminal device triggers a handover to a first candidate target cell,
information about a time interval from the time point at which the terminal device triggers the handover to the first candidate target cell to a time point at which the terminal device fails in accessing the first candidate target cell, and
information about a time interval from the time point at which the terminal device fails in accessing the first candidate target cell to a time point at which the terminal device sends at least one of the first failure cause value or the second failure cause value, wherein the first candidate target cell is one of the at least one candidate target cell.

17. The apparatus according to claim 15, wherein:
the second time information comprises:
information about a time interval from a time point at which the terminal device receives the conditional handover configuration information to a time point at which the terminal device determines that a first to-be-determined cell does not meet the handover trigger condition, and information about a time interval from the time point at which the terminal device determines that the first to-be-determined cell does not meet the handover trigger condition to a time point at which the terminal device sends the first failure cause value and/or the second failure cause value, the first to-be-determined cell being one of the at least one to-be-determined cell; or
the second time information comprises:
information about a time interval from the time point at which the terminal device receives the conditional handover configuration information to a time point at which the terminal device stops assessing whether the first to-be-determined cell meets the handover trigger condition, and information about a time interval from the time point at which the terminal device stops assessing whether the first to-be-determined cell meets the handover trigger condition to the time point at which the terminal device sends the first failure cause value and/or the second failure cause value.

18. The apparatus according to claim 12, wherein the operations further comprise:
receiving one or more of following information:
information about a first target cell, or a third cause value and third time information that correspond to the first target cell, the first target cell being a cell successfully accessed by the terminal device among the M candidate cells.

19. A communication apparatus, comprising:
at least one processor, and
one or more memories coupled to the at least one processor and storing programming instructions for execution by the at least one processor to perform operations comprising:
receiving, from a terminal device, a first failure cause value corresponding to at least one candidate target cell, or a second failure cause value corresponding to at least one to-be-determined cell, the at least one candidate target cell comprising X cells that meet a handover trigger condition and that the terminal device fails in accessing among M candidate cells, and the at least one to-be-determined cell comprising Y cells that do not meet the handover trigger condition among the M candidate cells, X and Y are natural numbers, X+Y is less than or equal to M, and the M candidate cells and the handover trigger condition are configured through conditional handover configuration information; and
sending at least one of the first failure cause value, or the second failure cause value to a first network device.

20. The apparatus according to claim 19, wherein:
the first failure cause value indicates that the at least one candidate target cell meets the handover trigger condition and the terminal device fails in accessing the at least one candidate target cell; or
the first failure cause value comprises a first-level failure cause value and a second-level failure cause value, the first-level failure cause value indicates that a conditional handover of the terminal device fails, and the second-level failure cause value indicates that the at least one candidate target cell meets the handover trigger condition and the terminal device fails in accessing the at least one candidate target cell.

21. The apparatus according to claim 19, wherein:
the second failure cause value indicates that the at least one to-be-determined cell does not meet the handover trigger condition; or
the second failure cause value comprises a third-level failure cause value and a fourth-level failure cause value, the third-level failure cause value indicates that a conditional handover of the terminal device fails, and the fourth-level failure cause value indicates that the at least one to-be-determined cell does not meet the handover trigger condition.

* * * * *